(12) United States Patent
Munenaga et al.

(10) Patent No.: US 7,618,083 B2
(45) Date of Patent: Nov. 17, 2009

(54) REAR DOOR STRUCTURE FOR VEHICLE

(75) Inventors: Kenichi Munenaga, Wako (JP); Fumiyoshi Mizutani, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 258 days.

(21) Appl. No.: 11/888,544

(22) Filed: Aug. 1, 2007

(65) Prior Publication Data

US 2008/0030047 A1 Feb. 7, 2008

(30) Foreign Application Priority Data

Aug. 2, 2006 (JP) ............... 2006-210880
Aug. 2, 2006 (JP) ............... 2006-210913

(51) Int. Cl.
*B60J 5/00* (2006.01)
(52) U.S. Cl. ............... 296/146.6; 296/146.5; 296/146.8
(58) Field of Classification Search ............ 296/187.11, 296/146.5, 146.6, 146.8
See application file for complete search history.

(56) References Cited

U.S. PATENT DOCUMENTS 7,537,267 B2 * 5/2009 Tanaka et al. ............ 296/146.6

2002/0030383 A1 * 3/2002 Gerber ............... 296/146.5
2007/0170751 A1 * 7/2007 Tanaka et al. ............ 296/146.6
2007/0210613 A1 * 9/2007 Tanaka et al. ............ 296/146.6

FOREIGN PATENT DOCUMENTS

| JP | 08-164826 | 6/1996 |
| JP | 08-258568 | 10/1996 |
| JP | 2004-203101 | 7/2004 |

* cited by examiner

*Primary Examiner*—Lori L Lyjak
(74) *Attorney, Agent, or Firm*—Carrier, Blackman & Associates P.C.; William D. Blackman; Joseph P. Carrier

(57) ABSTRACT

A rear door structure for a vehicle includes an inner panel disposed on an inner side of the vehicle and an outer panel disposed on an outer side of the vehicle, the inner panel including: a frame part corresponding to a contour of the rear door, and a pair of reinforcement parts that are integrally formed with the frame part, extend from a lower portion to both side portions of the frame part and are arranged in an approximate V-shape. The inner panel has a face portion smoothly and contiguously formed along an inner rim of the frame part from the side portion to the reinforcement part. The face portion has a step portion contiguously formed in an extending direction of the face portion.

14 Claims, 24 Drawing Sheets

INNER SIDE ← → OUTER SIDE

REAR DOOR STRUCTURE FOR VEHICLE

CROSS-REFERENCE TO RELATED APPLICATIONS

This application claims the foreign priority benefit under Title 35, United States Code, section 119 (a)-(d), of Japanese Patent Applications No. 2006-210880, filed on Aug. 2, 2006 and No. 2006-210913, filed on Aug. 2, 2006 in the Japan Patent Office, the disclosures of which are herein incorporated by reference in its entirety.

BACKGROUND OF THE INVENTION

1. Field of the Invention

The present invention relates to a rear door structure for a vehicle, and particularly to a flip-up type rear door structure hinged to an upper rim of a rear end opening of the vehicle.

2. Description of the Related Art

Conventionally, as a flip-up type rear door structure, there has been known a structure having an inner panel including: a frame part which corresponds to a contour of a rear door; and a lateral frame portion integrally formed with the frame part that separates the frame part into an upper portion and a lower portion (see, for example, Japanese unexamined patent publication No. 8-258568 (paragraphs 0010-0015 and FIG. 1)). FIG. 25 shows a schematic diagram illustrating a conventional rear door structure seen from a rear side of a vehicle. As shown in FIG. 25, a rear door structure 101 of a vehicle V has an inner panel 106 including a frame part 109 and a lateral frame portion (or also called "lateral beam") 120. On an upper side of the lateral frame portion 120, an opening 112a is bounded by the frame part 109 and the lateral frame portion 120, into which a rear window 107 is installed. On a lower side of the lateral frame portion 120, an opening 112b is bounded by the frame part 109 and the lateral frame portion 120, in which two separate reinforcement parts (connecting reinforcements) 110a, 110b are arranged in an approximate V-shape. A lower end of each of the reinforcement parts 110a, 110b is welded to a lock reinforcement 111 joined with a center portion of a lower bar portion of the frame part 109, and the reinforcement parts 110a, 110b extend to their respective upper corners of the opening 112b. Upper ends of the reinforcement parts 110a, 110b are welded to corner reinforcements 130a, 130b, respectively, which are joined with the upper corners of the opening 112b where the frame part 109 and the lateral frame portion 120 meet.

In this rear door structure 101, rigidity of the inner panel 106 is enhanced by two separate reinforcement part 110a, 110b arranged at the opening 112b.

However in the conventional rear door structure, though rigidity of the rear door is enhanced, introduction of the reinforcements creates a problem of weight increase, and welding of the reinforcements creates a problem of an increased number of production steps. In addition, when rigidity is not sufficiently high, a space bounded by the lateral frame portion 120 and the reinforcement parts 110a, 110b may vibrate when the vehicle V is running or an engine thereof is idled. This vibration is transmitted to a vehicle interior as unpleasant noise and vibration (NV), and may disturb quietness of the vehicle V.

Therefore, it would be desirable to provide a rear door structure for a vehicle in which rigidity is sufficiently secured while the number of production steps does not increase, as compared with the conventional rear door structure. It would be further desirable to provide a rear door structure for a vehicle in which quietness of the vehicle is secured by enhancing rigidity.

SUMMARY OF THE INVENTION

In one aspect of the present invention, there is provided a rear door structure for a vehicle including an inner panel disposed on an inner side of the vehicle and an outer panel disposed on an outer side of the vehicle, the inner panel including: a frame part corresponding to a contour of the rear door, a pair of reinforcement parts that are integrally formed with the frame part, extend from a lower portion to both side portions of the frame part and are arranged in an approximate V-shape, and a face portion smoothly and contiguously formed along an inner rim of the frame part from the side portion to the reinforcement part, wherein the face portion has a step portion contiguously formed in an extending direction of the face portion.

BRIEF DESCRIPTION OF THE DRAWINGS

The various aspects, other advantages and further features of the present invention will become more apparent by describing in detail illustrative, non-limiting embodiments thereof with reference to the accompanying drawings.

DETAILED DESCRIPTION OF THE EXEMPLARY EMBODIMENTS

Embodiments of the present invention will be described in detail below with reference to the accompanying drawings. In the following description, the present invention is exemplified with an automobile, and terms "front", "rear", "upper" and "lower" mean respective sides relative to the vehicle body, and terms "left" and "right" mean respective sides relative to the vehicle body when seen from a driver/passenger seated in the vehicle body.

First Embodiment

A rear door structure for a vehicle according to a first embodiment of the present invention will be described in detail with reference to FIGS. 1-4.

Figure 1:
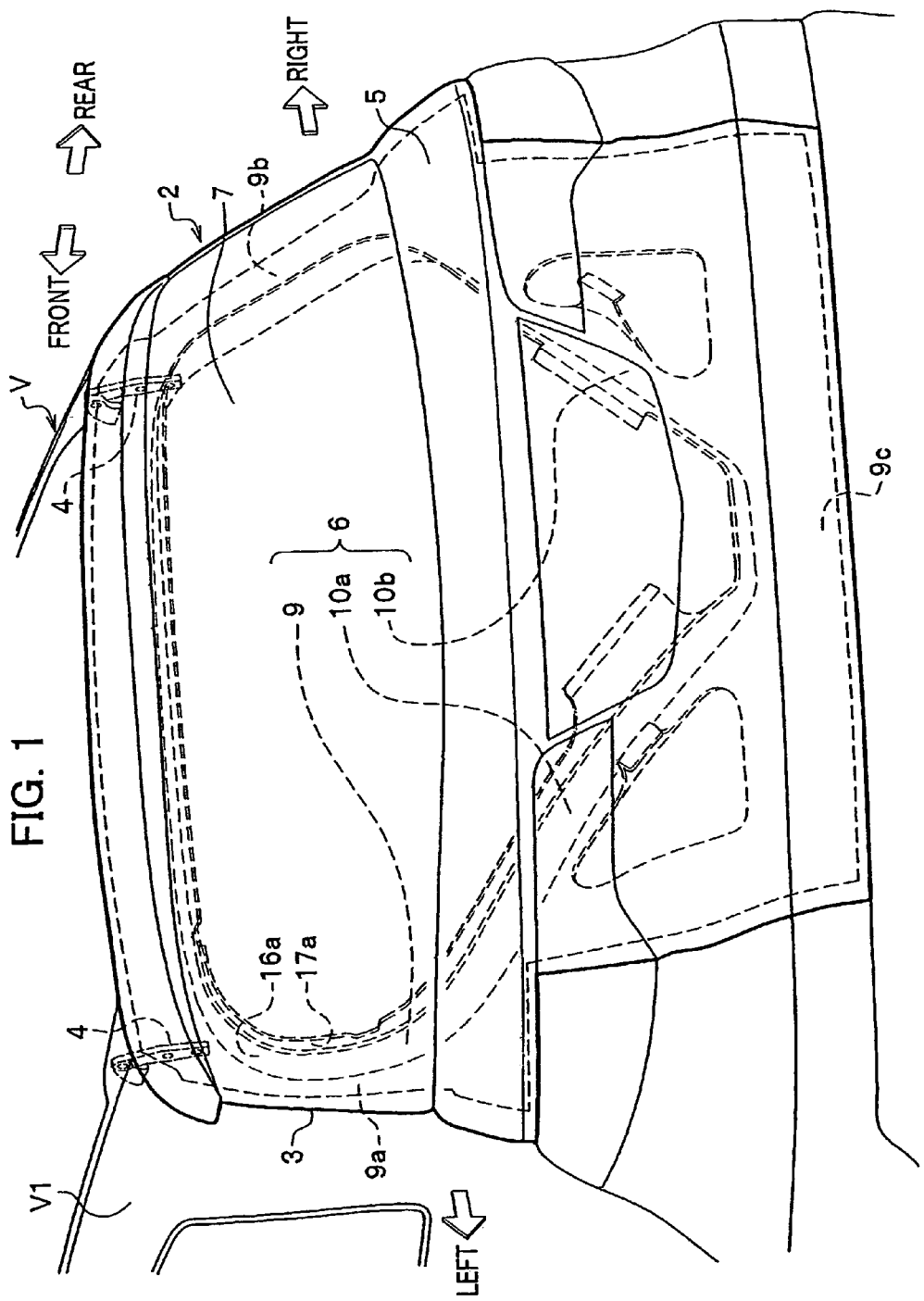
FIG. 1 is a perspective view of a part of a vehicle having a rear door structure according to a first embodiment.

As shown in FIG. 1, a rear door structure 1 of a vehicle V according to the first embodiment is applied to a rear door 2 that closes and opens an opening 3 on a rear end of the vehicle V. An upper rim of the rear door 2 is rotatably hinged at an upper rim of the opening 3 with a pair of hinges 4, 4. In other words, the rear door structure 1 is a flip-up type structure in which the door 2 is pivoted at the upper rim thereof. In addition, at a center portion of a lower portion of the rear door 2, a locking device (not shown) is disposed for locking the rear door 2 to a vehicle body V1 when the rear door 2 is closed.

The rear door 2 includes: an outer panel (also called as skin) 5 disposed on an outer side of the vehicle V and forms an outer surface of the vehicle V; and an inner panel (also called as inner frame) 6 disposed on an inner side relative to the outer panel 5. It should be noted that a rear window 7, lamps and the like are attached to the outer panel 5.

Figure 2:
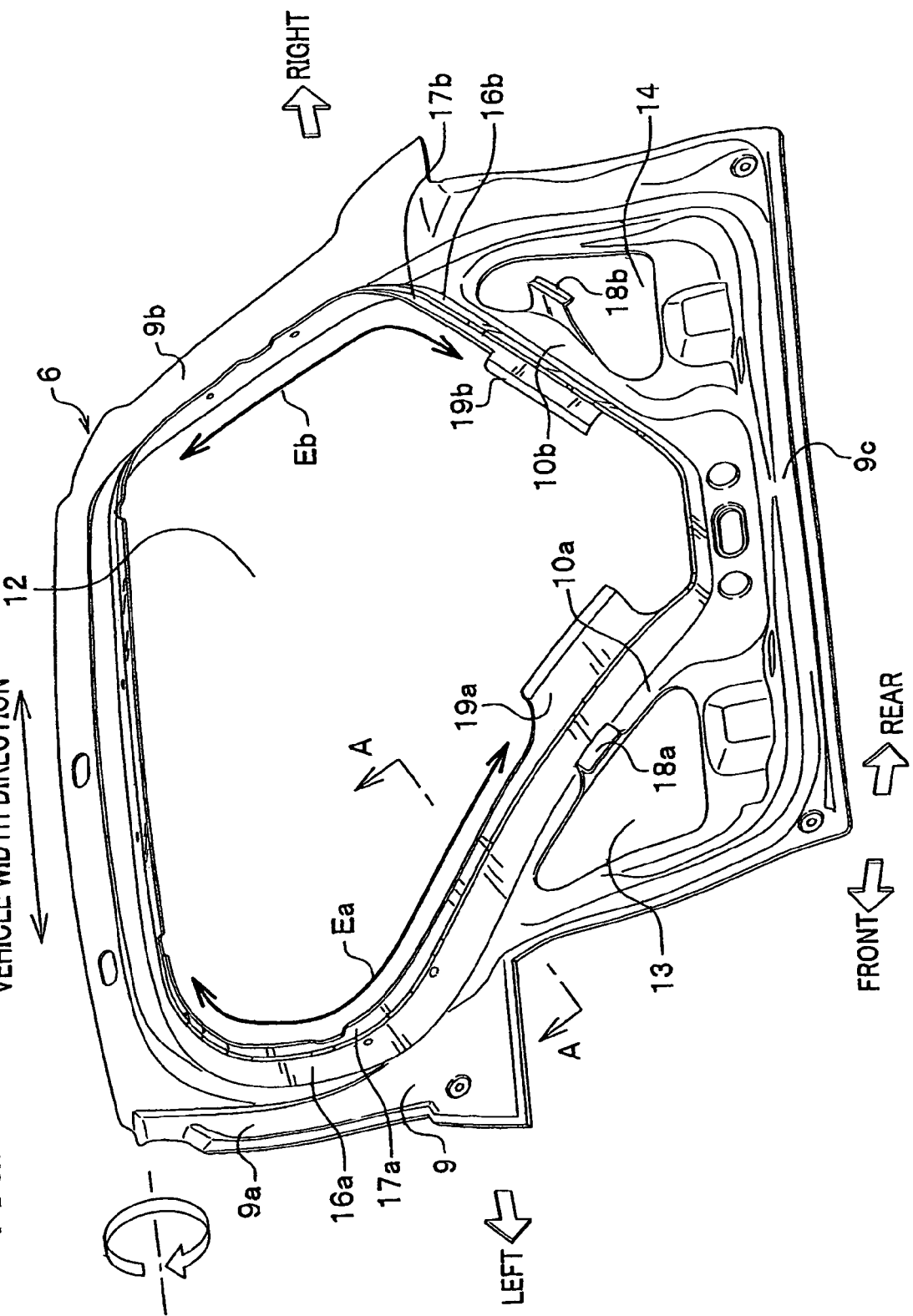
FIG. 2 is a perspective view of an inner panel of the rear door structure according to the first embodiment seen from a rear side of the vehicle.

The inner panel 6 includes: a frame part 9 corresponding to a contour of the rear door 2; and reinforcement parts 10a, 10b integrally formed with the frame part 9, as shown in FIG. 2.

The frame part 9 is produced by press molding a metal plate. As shown in FIG. 2, an outline of the frame part 9 is in a shape of an approximate rectangle, and in the frame part 9, an opening in a shape of an approximate rectangle is formed when seen from a rear side as a plan view.

The reinforcement parts 10a, 10b are narrow pieces having a specific width pattern, and extend from a lower portion 9c of the frame part 9, specifically a center portion of the lower portion 9c in a vehicle width direction, to side portions 9a, 9b of the frame part 9 and thus are arranged in an approximate V-shape. As a result, in the inner panel 6, there are formed: an opening 12 in a shape of an approximate home-plate (hexagon) bounded by the frame part 9 and the reinforcement parts 10a, 10b; an opening 13 in a shape of an approximate triangle bounded by the frame part 9 and the reinforcement part 10a below the opening 12; and an opening 14 in a shape of an approximate triangle bounded by the frame part 9 and the reinforcement part 10b below the opening 12. In the present embodiment, a vertical position where the reinforcement parts 10a, 10b are joined with the side portions 9a, 9b of the frame part 9 is determined to be around a vertical position of a lower rim of the rear window 7 (see FIG. 1).

As shown in FIG. 2, the inner panel 6 has a face portion 16a (16b) smoothly and contiguously extending from a side portion 9a (9b)-side to a reinforcement part 10a (10b)-side along a rim of the opening 12. The face portions 16a, 16b stand from the frame part 9 towards the outer panel 5 (see FIG. 1), i.e., protrude towards an outer side of the vehicle V, in an opening/closing direction of the rear door 2 (see FIGS. 3 and 4).

On a rim portion of the face portion 16a (16b), a step portion 17a (17b) is contiguously formed in an extending direction Ea (Eb) of the face portion 16a (16b). The step portion 17a (17b) having a L-shaped cross section extends stepwise from the face portion 16a (16b) and is positioned on an inner side of the opening 12 relative to the face portion 16a (16b) (see FIG. 3).

Figure 3:
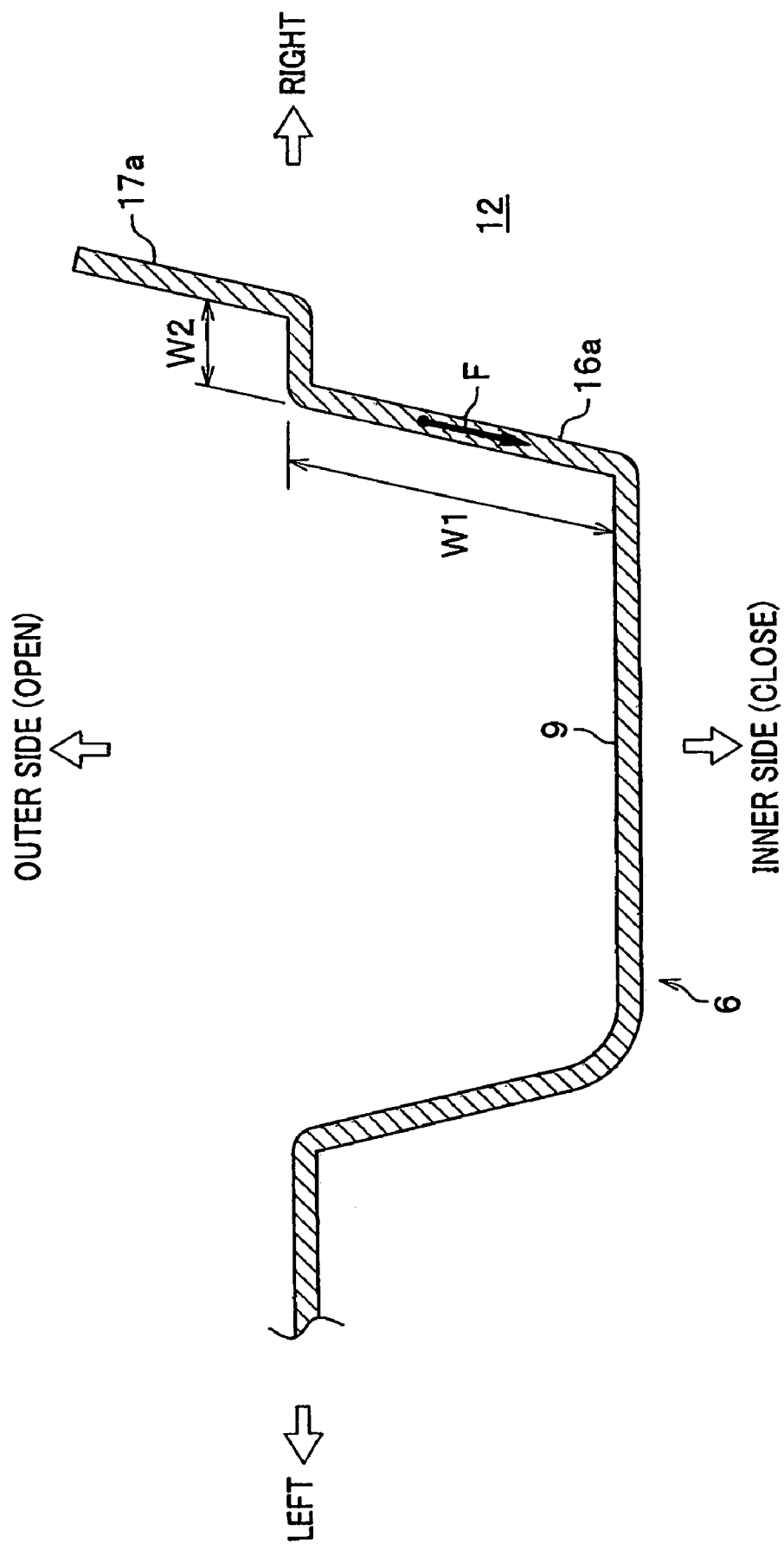
FIG. 3 is a sectional view taken along a line A-A in FIG. 2.

As shown in FIG. 3, a height (protruding length) W1 of the face portion 16a and a width (horizontal step) W2 of the step portion 17a are formed so as to become approximately constant along the extending direction Ea (see FIG. 1). Likewise, with respect to the face portion 16b and the step portion 17b, W1 and W2 are formed so as to become approximately constant along the extending direction Eb (see FIG. 1).

In the reinforcement part 10a, as shown in FIG. 2, a stand-up portion 18a is formed on a rim of the opening 13, protruding in a direction towards the outer panel 5 (see FIG. 1), i.e., the outer side of the vehicle. Also in the reinforcement part 10a, a stand-up portion 19a is formed on the rim of the opening 12, protruding in the same direction as the protruding direction of the stand-up portion 18a. In the same manner as in the reinforcement part 10a, in the reinforcement part 10b, a stand-up portion 18b is formed on a rim of the opening 14, and a stand-up portion 19b is formed on the rim of the opening 12. Ends of the stand-up portions 18a, 18b, 19a, 19b are configured for being joined with the outer panel 5 (see FIG. 1).

Next, effects of the rear door structure 1 of the vehicle V according to the first embodiment will be described.

In the rear door structure 1 according to the first embodiment, as described above, the step portions 17a, 17b are formed on the face portions 16a, 16b, respectively. As a result, as compared with a rear door structure without the step portions 17a, 17b, flexural rigidity at the face portions 16a, 16b is enhanced, and thus rigidity of the inner panel 6 (rear door 2) can be enhanced.

In addition, in the rear door structure 1 according to the first embodiment, the frame part 9 and the reinforcement parts 10a, 10b are integrally formed by press molding or the like. Therefore, unlike the conventional rear door structure, a plurality of reinforcements is not required for reinforcing the rear door 2. As a result, welding for joining the reinforcements becomes not necessary, and it becomes possible to sufficiently secure rigidity while the number of production steps does not increase.

Figure 4:
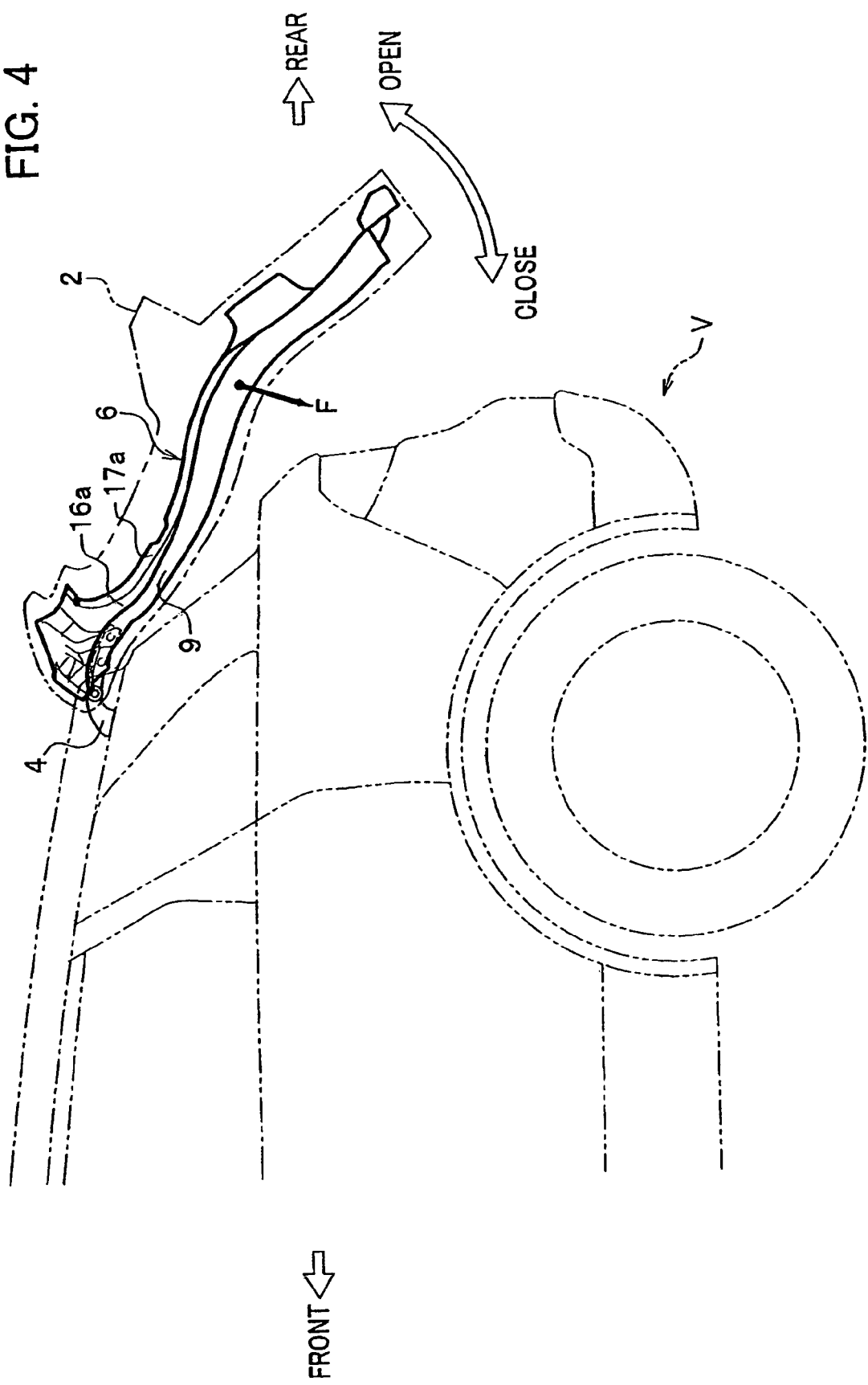
FIG. 4 is a side view showing the inner panel according to the first embodiment.

Moreover, in the rear door structure 1 according to the first embodiment, as shown in FIG. 3, the face portion 16a (16b) protrudes in the opening/closing direction of the rear door 2 (see FIG. 4). In other words, the protruding direction of the face portion 16a (16b) (which direction is highly resistance to stress) is designed to coincide with a direction of a load F on the rear door 2 when the rear door 2 is opened or closed (see FIGS. 3 and 4). Therefore, rigidity of the inner panel 6 can be maintained high against the load F on the rear door 2, and thus high rigidity of the rear door 2 can be secured. It should be noted that the direction of the load F shown in FIG. 4 is merely an example, and though the direction changes during the opening/closing of the rear door 2 (at a position between an opened position and an closed position of the rear door 2) in practice, the direction is maintained to match the protruding direction of the face portion 16a (16b), and as a result, high rigidity of the rear door 2 can be maintained.

Second Embodiment

Next, a rear door structure for a vehicle according to a second embodiment of the present invention will be described in detail with reference to FIGS. 5-8.

Figure 5:
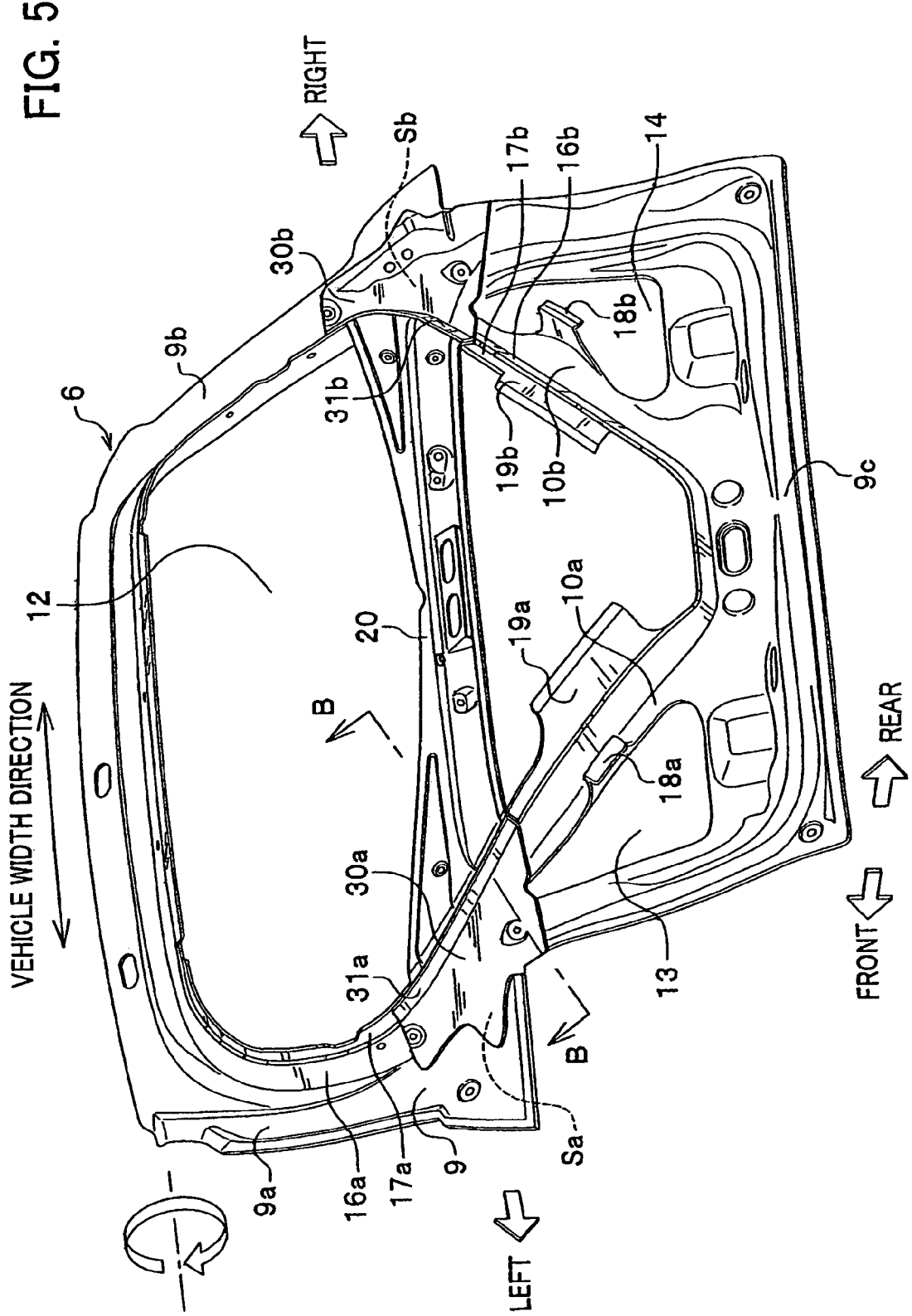
FIG. 5 is a perspective view of an inner panel of the rear door structure according to a second embodiment seen from a rear side of the vehicle.
Figure 6:
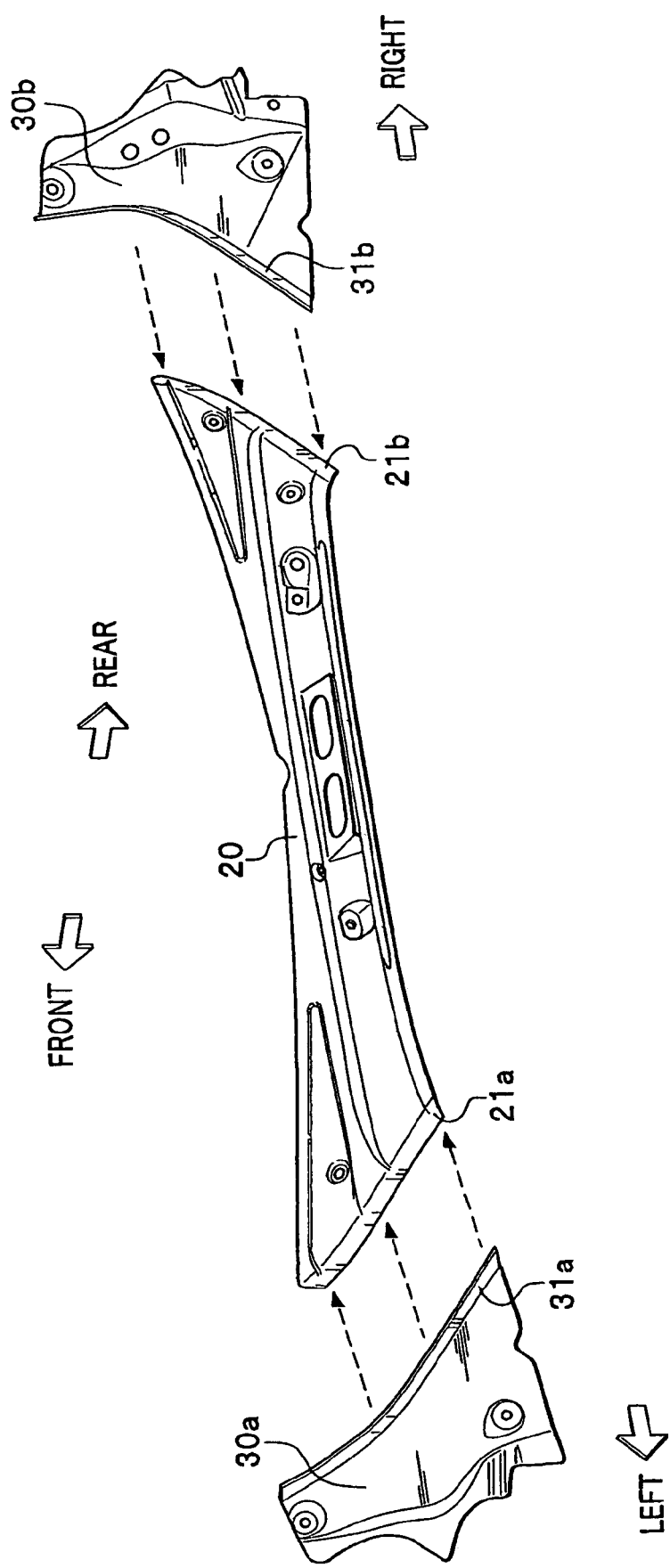
FIG. 6 is an exploded view showing a lateral beam and corner stiffeners.
Figure 7:
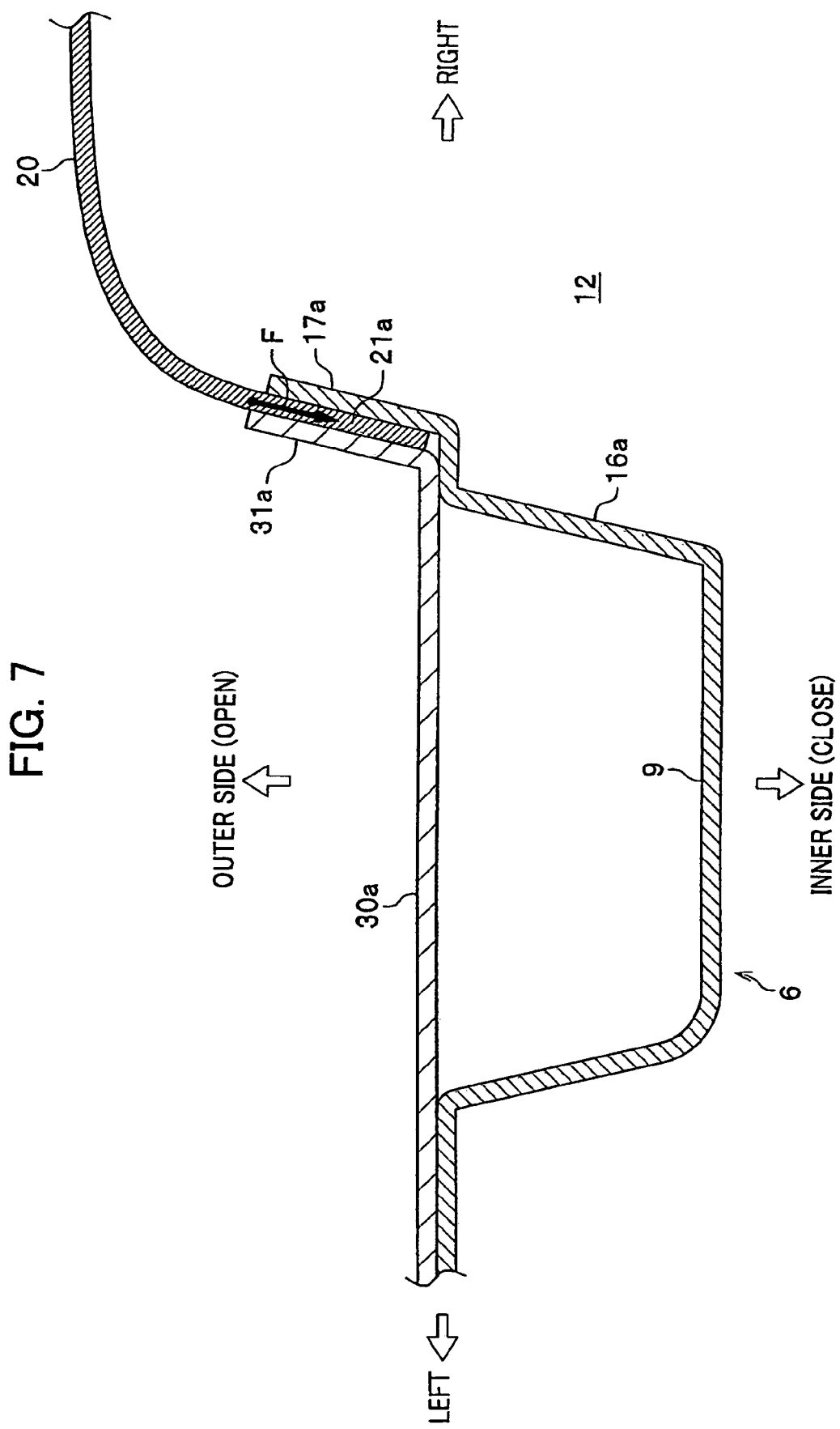
FIG. 7 is a sectional view taken along a line B-B in FIG. 5.
Figure 8:
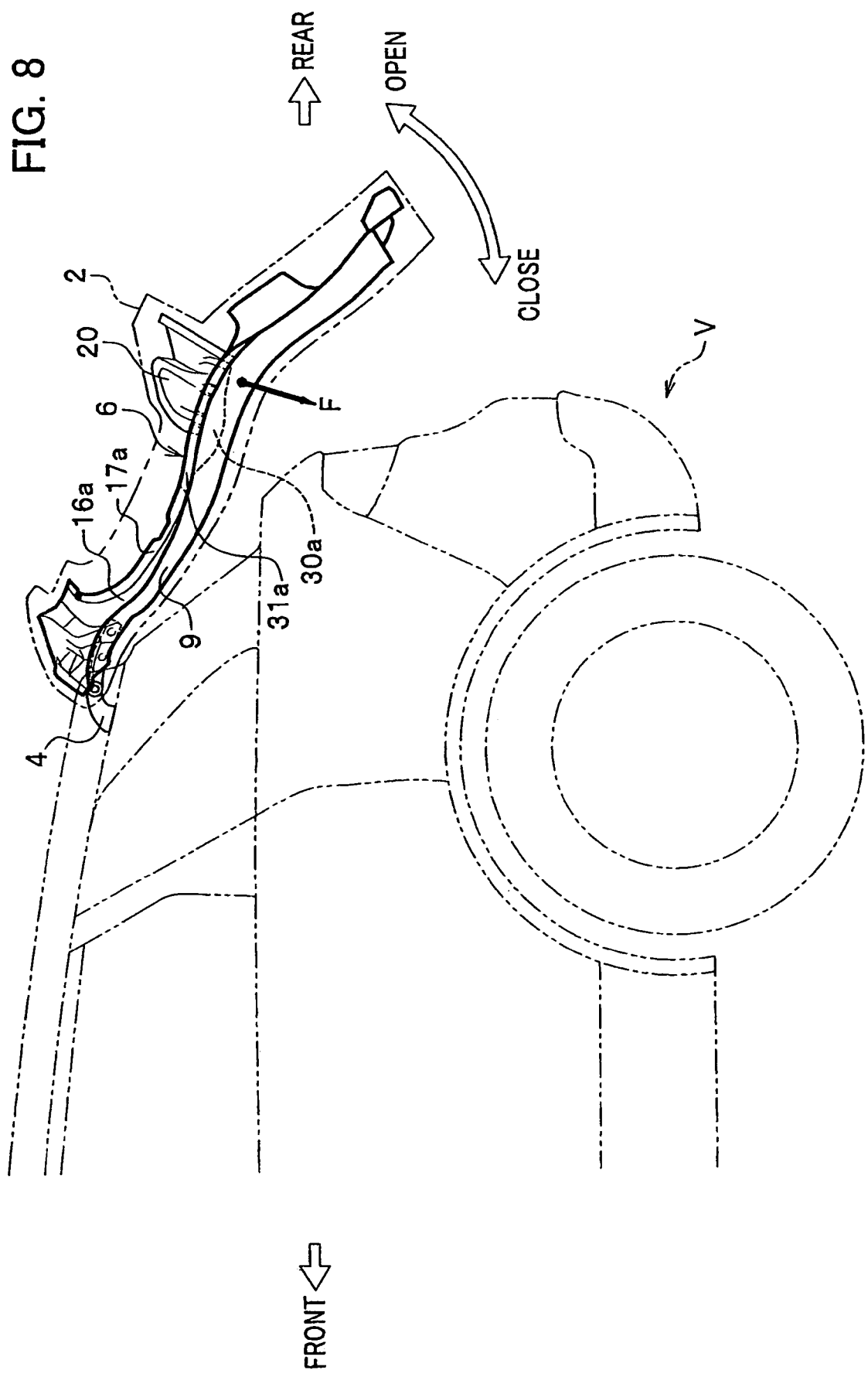
FIG. 8 is a side view showing the inner panel according to the second embodiment.

FIG. 5 is a perspective view of an inner panel of the rear door structure according to a second embodiment seen from a rear side of the vehicle. FIG. 6 is an exploded view showing a lateral beam and corner stiffeners. FIG. 7 is a sectional view taken along a line B-B in FIG. 5. FIG. 8 is a side view showing the inner panel according to the second embodiment. The rear door structure according to the second embodiment is the same as the rear door structure according to the first embodiment except the inner panel, and therefore, the following description is made mainly with respect to the inner panel. Some components, which are the same as those illustrated in the first embodiment, are designated with the same reference characters, and thus a duplicate description is omitted.

As shown in FIG. 5, the rear door structure 1 of the vehicle V according to the second embodiment further has a lateral beam 20 and corner stiffeners 30a, 30b, in addition to the above-mentioned inner panel 6. The inner panel 6 according to the second embodiment is the same as the inner panel 6 according to the first embodiment except the lateral beam 20 and the corner stiffeners 30a, 30b. Some components, which are the same as those illustrated in the first embodiment, are designated with the same reference characters, and thus a duplicate description is omitted.

The lateral beam 20 is formed separately from the inner panel 6 (the frame part 9 and the reinforcement parts 10a, 10b), and extends in the vehicle width direction between connecting portions Sa, Sb, where the side portions 9a, 9b meet the reinforcement parts 10a, 10b of the frame part 9, respectively. The lateral beam 20 is configured in a shape of an arch protruding in a direction of the outer side (rear side) of the vehicle, to correspond to a curvature of an outer face of the rear door 2 (outer face of the outer panel 5) (see FIG. 1). The lateral beam 20 is configured for being disposed along the lower rim of the rear window 7 (see FIG. 1).

As shown in FIG. 6, the lateral beam 20 is formed so as to have the smallest width at a center portion and have a larger width at a position closer to the side portions. An end portion 21a (21b) thereof is bent toward the inner side of the vehicle with approximately a constant width along the edge and extends along the extending direction Ea (Eb) of the step portion 17a (17b) (face portion 16a (16b)) (see FIG. 1). As shown in FIG. 7, the end portion 21a (21b) protrudes in a direction that matches the opening/closing direction of the rear door 2 (see FIG. 8). The end portion 21a is joined with the step portion 17a in such a manner that an inner face of the end portion 21a (face on the right side in FIG. 7) and an outer face of the step portion 17a (face on the left side in FIG. 7) closely abut each other.

As shown in FIG. 5, the corner stiffeners 30a, 30b serve as reinforcing members, and disposed on the inner panel 6 at the connecting portions Sa, Sb where the side portions 9a, 9b and the reinforcement parts 10a, 10b of the frame part 9 meet. The corner stiffener 30a (30b) is made of a member in a shape of a plate, and has a joint portion 31a (31b) that is bent toward the outer side of the vehicle with approximately the same width as the height of the step portion 17a (17b) and extends along the extending direction Ea (Eb) of the step portion 17a (17b) (face portion 16a (16b)) (see FIG. 1), at a rim of the corner stiffener 30a (30b) on an opening 12-side. As shown in FIG. 7, the joint portion 31a is joined with the step portion 17a in such a manner that the joint portion 31a overlaps the end portion 21a of the lateral beam 20 that has joined with the step portion 17a.

In practice, the lateral beam 20 and the corner stiffener 30a, 30b are joined in the following manner: the end portion 21a (21b) of the lateral beam 20 is joined with the joint portion 31a (31b) of the corner stiffener 30a (30b) by welding or the like, and the joined body of the end portion 21a (21b) with the joint portion 31a (31b) is joined with the step portion 17a (17b) by welding or the like. In addition, portions of the corner stiffener 30a (30b) other than the joint portion 31a (31b) are joined with the side portion 9a (9b) and the reinforcement part 10a (10b) of the frame part 9 by welding or the like.

Next, effects of the rear door structure 1 of the vehicle V according to the second embodiment will be described.

In the rear door structure 1 according to the second embodiment, like the effects according to the first embodiment, formation of the step portions 17a, 17b on the face portions 16a, 16b enhances flexural rigidity at the face portions 16a, 16b, and thus rigidity of the inner panel 6 (rear door 2) can be enhanced.

In addition, in the rear door structure 1 according to the second embodiment, the end portions 21a, 21b of the lateral beam 20 are joined with the step portions 17a, 17b, i.e., with the face portions 16a, 16b having high rigidity. Therefore, rigidity of the inner panel 6 (rear door 2) can be further enhanced.

Moreover, in the rear door structure 1 according to the second embodiment, the corner stiffeners 30a, 30b are provided. Therefore, rigidity at the joint portion between the inner panel 6 and the lateral beam 20 is enhanced, and thus rigidity of the inner panel 6 (rear door 2) can be still further enhanced.

Further, in the rear door structure 1 according to the second embodiment, as shown in FIG. 7, all of the face portion 16a (16b); the end portion 21a (21b) of the lateral beam 20 joined with the step portion 17a (17b); and the joint portion 31a (31b) of the corner stiffener 30a (30b), protrude in the opening/closing direction of the rear door 2 (FIG. 8). Therefore, rigidity of the rear door 2 can be maintained high against the load F on the rear door 2 when the rear door 2 is opened or closed.

Further, in the rear door structure 1 according to the second embodiment, by joining the lateral beam 20 and the corner stiffeners 30a, 30b in advance, the number of production steps can be reduced.

As shown in FIG. 5, in the rear door structure 1, the window frame part 8 is bounded by the upper portion of the frame part 9 and the lateral beam 20, and below the window frame part 8, three triangular holes (when seen from the rear side as a plan view) are formed by the lateral beam 20, and the reinforcement parts 10a, 10b. As a result, in the rear door structure 1, holes in the inner panel 6 bounded by the frame part 9, the lateral beam 20 and the reinforcement parts 10a, 10b are made as large as possible, and thus weight saving is attained, while enhancing rigidity.

Modified Version of Second Embodiment

Figure 9:
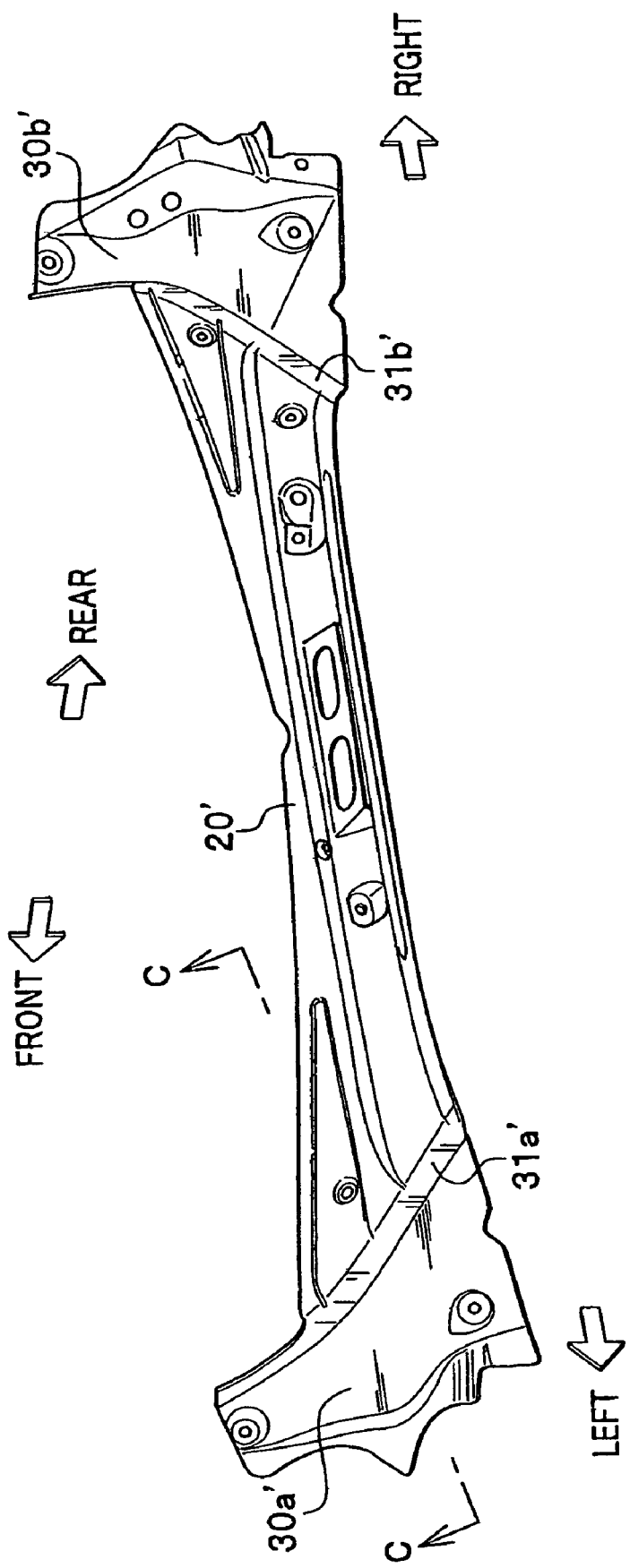
FIG. 9 is a perspective view showing a modified version of the lateral beam according to the second embodiment.

The present invention is not limited to the above embodiments, and it is a matter of course that the above embodiments may be properly modified. For example, in the second embodiment, the lateral beam 20 and the corner stiffeners 30a, 30b are separate members. However, as shown in FIG. 9, the lateral beam 20' and the corner stiffeners 30a', 30b' may be integrally formed as one member. In this case, at a boundary between the corner stiffener 30a' (30b') and the lateral beam 20', a fixing portion 31a' (31b') is formed that extends in the extending direction of the step portion 17a (17b) (face portion 16a (16b)). It should be noted that the fixing portion 31a' (31b') corresponds to the joint portion 31a (31b) between the end portion 21a (21b) of the lateral beam 20 and the corner stiffener 30a (30b).

Figure 10:
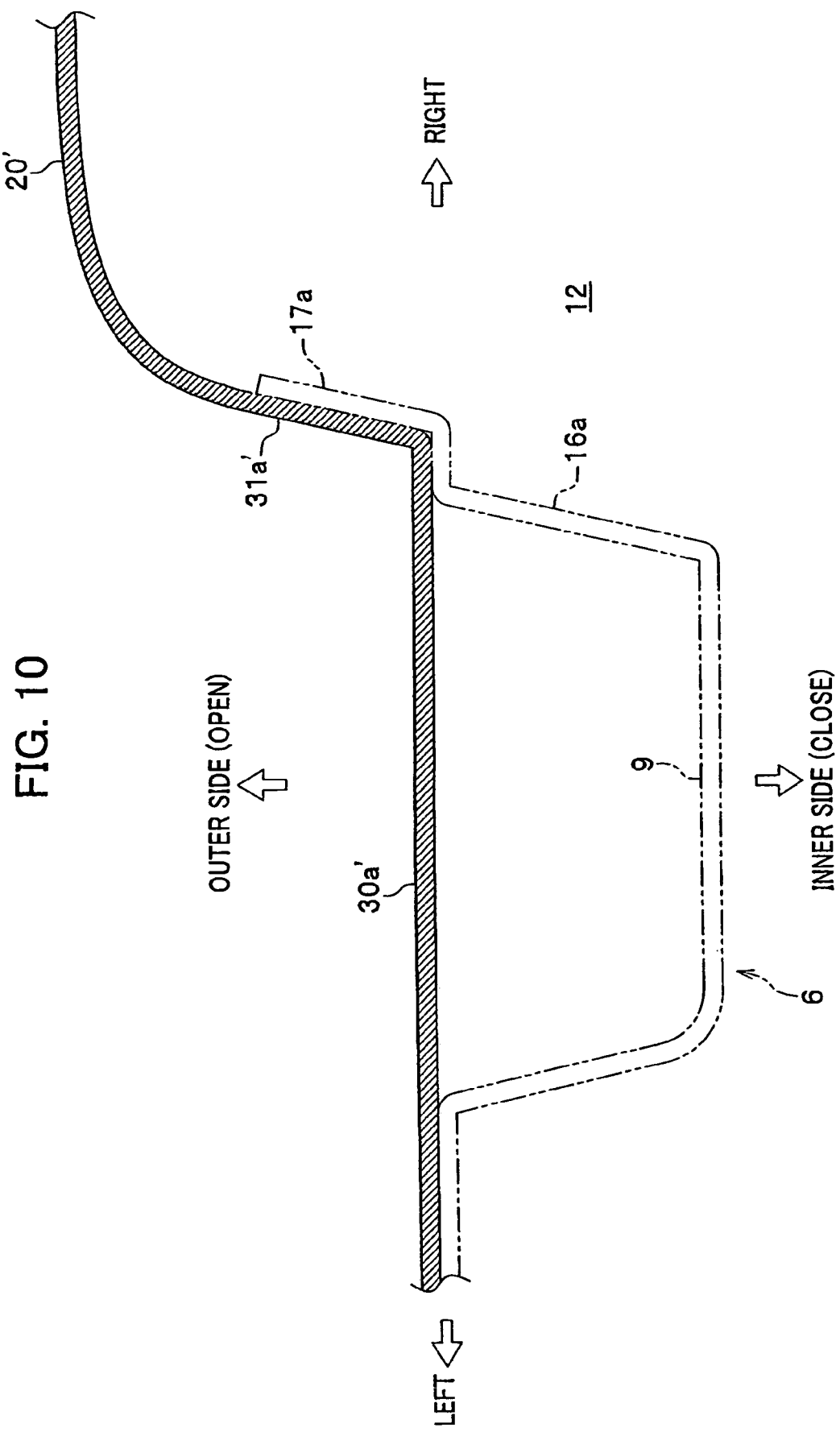
FIG. 10 is a sectional view taken along a line C-C in FIG. 9.

In the present modified embodiment, as shown in FIG. 10, the face portion 16a (16b) and the fixing portion 31a' (31b') extend in the opening/closing direction of the rear door 2. Therefore, rigidity of the rear door 2 can be maintained high. In addition, since the lateral beam 20' and the corner stiffeners 30a', 30b' are integrally formed, the number of welding can be reduced as compared with the number of welding in the second embodiment, and therefore the number of production steps does not increase.

Though the lateral beam 20 and the corner stiffeners 30a, 30b are provided in the second embodiment, only the lateral beam 20 may be provided.

Third Embodiment

Next, a rear door structure for a vehicle according to a third embodiment of the present invention will be described in detail with reference to FIGS. 11-14.

Figure 11:
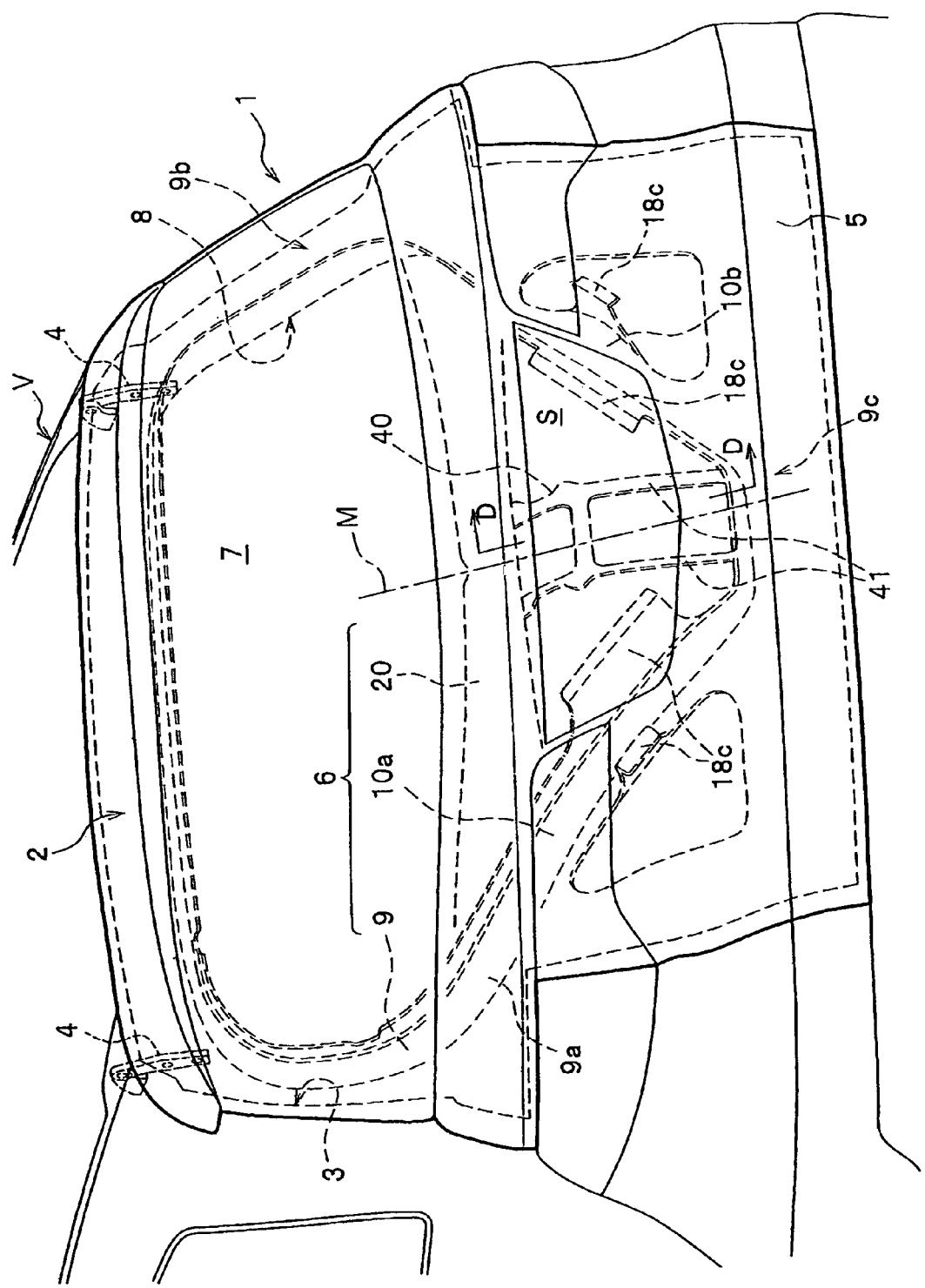
FIG. 11 is a perspective view of a part of a vehicle having a rear door structure according to a third embodiment.
Figure 12:
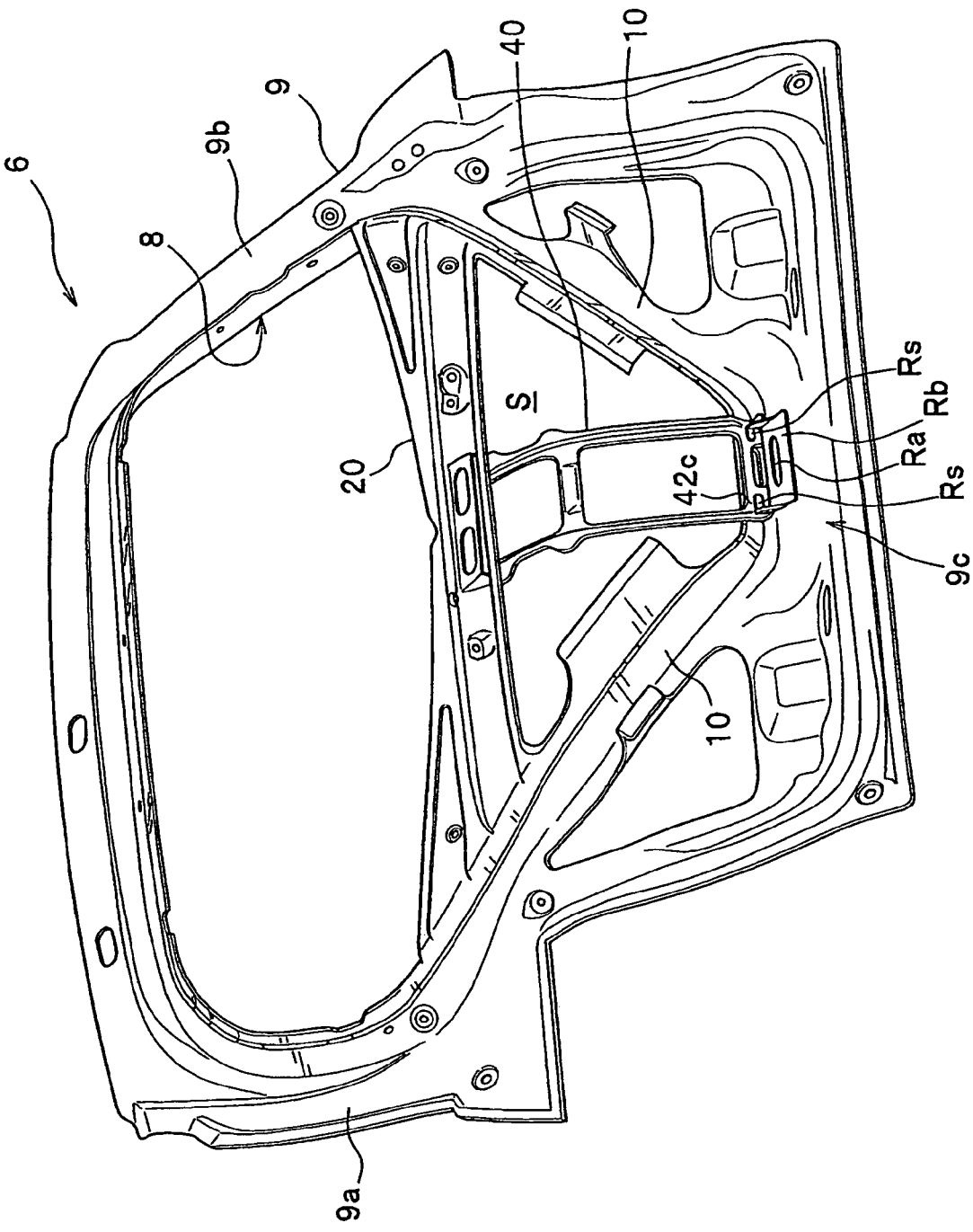
FIG. 12 is a perspective view of an inner panel of the rear door structure according to the third embodiment seen from a rear side of the vehicle.
Figure 13:
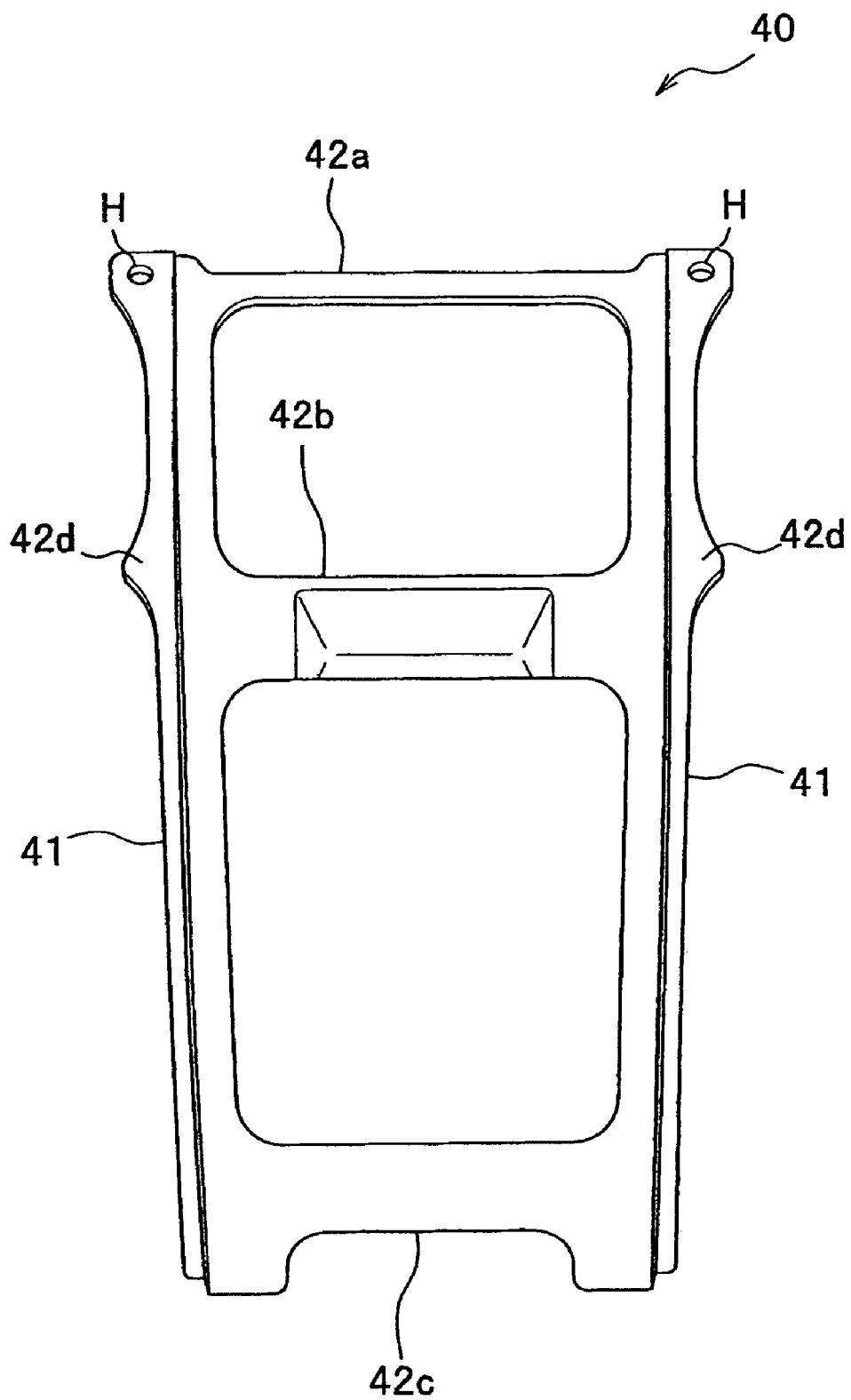
FIG. 13 is a plan view of a reinforcing member.
Figure 14:
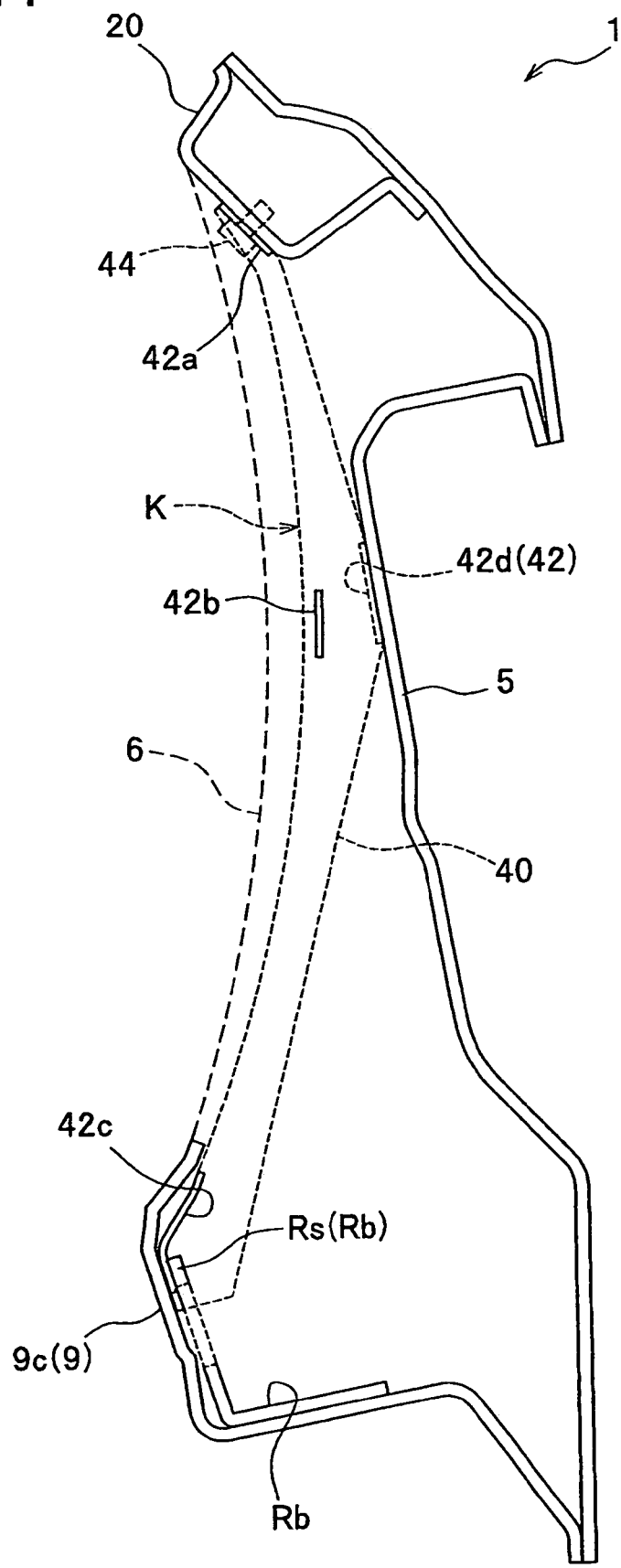
FIG. 14 is a sectional view taken along a line D-D in FIG. 11.

FIG. 11 is a perspective view of a part of a vehicle having a rear door structure according to a third embodiment. FIG. 12 is a perspective view of an inner panel of the rear door structure according to the third embodiment seen from a rear side of the vehicle. FIG. 13 is a plan view of a reinforcing member. FIG. 14 is a sectional view taken along a line D-D in FIG. 11. The rear door structure according to the third embodiment is the same as the rear door structure of the second embodiment except that an additional reinforcing member is included. Some components, which are the same as those illustrated in the first and second embodiments, are designated with the same reference characters, and thus a duplicate description is omitted. In the present embodiment, the same effect can be obtained both in a case where the lateral beam 20 and the frame part 9 are separate members and in a case where they are integrally formed. In the following description, the lateral beam 20 and the frame part 9 are illustrated as an integrated part, but the present invention is not limited to this specific embodiment.

As shown in FIG. 11, the rear door structure 1 of the vehicle V according to the third embodiment further has a reinforcing member 40 on the outer panel 5 and the inner panel 6, at the center portion of the rear door 2 in the vehicle width direction.

The inner panel 6 includes: the frame part 9 corresponding to a contour of the rear door 2; the lateral beam 20 integrally formed with the frame part 9; and the reinforcement parts 10a, 10b integrally formed with the frame part 9, as shown in FIG. 12. The frame part 9, the lateral beam 20 and the reinforcement parts 10a, 10b are produced by press molding a metal plate.

As shown in FIG. 12, an outline of the frame part 9 is in a shape of an approximate rectangle. In the frame part 9, the lateral beam 20 extends between the side portions 9a, 9b of the frame part 9. The lateral beam 20 separates the space formed in the frame part 9 into an upper space as the window frame part 8 and a lower space. In other words, as shown in FIG. 11, the lateral beam 20 serves as a lower frame part of the window frame part 8. In the window frame part 8, the rear window 7 is disposed.

The reinforcement parts 10a, 10b are narrow pieces having a specific width pattern, and extends from the lower portion 9c of the frame part 9, specifically the center portion of the lower portion 9c in the vehicle width direction, to the side portions 9a, 9b of the frame part 9 and thus are arranged in an approximate V-shape. In the present embodiment, lower ends of the reinforcement parts 10a, 10b flank (are on each side of) a locking device mounting portion Ra (which will be described below; see FIG. 12) in the vehicle width direction, and upper ends of the reinforcement parts 10a, 10b are positioned at portions where the lateral beam 20 and the frame part 9 meet. As a result, below the window frame part 8, a space S is bounded by the lateral beam 20 and the reinforcement parts 10a, 10b.

In the reinforcement parts 10a, 10b, as shown in FIG. 11, stand-up portions 18c are formed at appropriate positions, protruding in a direction towards the outer side of the vehicle. The stand-up portions 18c are configured for being joined with the outer panel 5, by spot welding or the like.

The inner panel 6 which is mainly composed of the frame part 9, the lateral beam 20 and the reinforcement parts 10a, 10b is configured in a shape of an arch protruding in a direction of the outer side of the vehicle.

As shown in FIG. 11, the reinforcing member 40 is disposed at the center portion of the rear door 2 in the vehicle width direction. The reinforcing member 40 has a pair of long and narrow reinforcing portions 41, 41, which extend in a vertical direction of the rear door 2. The reinforcing portions 41, 41 are arranged approximately in parallel while flanking a center line M in the vehicle width direction of the rear door 2.

As shown in FIG. 13, the reinforcing member 40 has an upper connecting portion 42a, a middle connecting portion 42b and a lower connecting portion 42c for connecting two reinforcing portions 41, 41. It should be noted that each of the upper connecting portion 42a, the middle connecting portion 42b and the lower connecting portion 42c correspond to "connecting portion". The upper connecting portion 42a, the middle connecting portion 42b and the lower connecting portion 42c are arranged from the top to the bottom of the reinforcing portions 41, 41 in this order, and integrally formed with the reinforcing portions 41, 41.

The reinforcing member 40 has a bold hole H in an upper end portion of each reinforcing portion 41 for joining the reinforcing member 40 to the lateral beam 20. In addition, in each of the reinforcing portions 41, 41, a joint portion 42d is formed for joining the reinforcing member 40 to an inner face (inner side of the vehicle) of the outer panel 5. The joint portion 42d protrudes from the reinforcing portion 41 in the vicinity of the middle connecting portion 42b, outward from the reinforcing member 40 in the vehicle width direction. It should be noted that the reinforcing member 40 of the present embodiment is produced by press molding a metal plate.

As shown in FIG. 14, the reinforcing member 40 is configured in a shape of an arch, when seen from the side, to correspond to the shape of the inner panel 6 which is curved as described above. The reinforcing member 40 is joined with the lateral beam 20 having a square U-shaped cross section by bolts 44, 44 which are inserted in the bold holes H (see FIG. 13) formed in the reinforcing portions 41, 41. In addition, the reinforcing member 40 is joined with the outer panel 5 by spot welding of the joint portion 42d of the reinforcing portion 41 to the outer panel 5. To sum up, the reinforcing member 40 is joined with both the lateral beam 20 and the outer panel 5. In the present embodiment, the reinforcing member 40 (reinforcing portion 41, 41) is joined with the lateral beam 20 with bolts 44, 44. However in the present invention, any means for joining the reinforcing member 40 can be used, such as fastening member other than bolt, and spot welding. In the present embodiment, the reinforcing member 40 (joint portion 42d) is joined with the outer panel 5 by spot welding. However in the present invention, any means for joining the reinforcing member 40 can be used, such as bolt.

As shown in FIG. 14, the reinforcing member 40 is also joined with the inner panel 6, further at other portion of the reinforcing member 40 than a portion joined with the lateral beam 20 (i.e., around the bold hole H (see FIG. 13)). Specifically, as shown in FIG. 12, the lower connecting portion 42c of the reinforcing member 40 is joined with a portion of the inner panel 6 around the locking device mounting portion Ra formed at the center portion of the lower portion 9c of the frame part 9. In the case of this inner panel 6, the lower connecting portion 42c is also joined with a lock stiffener Rb for reinforcing the portion around the locking device mounting portion Ra. As shown in FIG. 12, the lock stiffener Rb has supporting portions Rs, Rs on each side of the locking device mounting portion Ra in the vehicle width direction and extend toward the center. As shown in FIG. 14, a portion of the lower connecting portion 42c of the reinforcing member 40 is sandwiched between the lower portion 9c of the frame part 9 and the supporting portion Rs of the lock stiffener Rb, and the lower connecting portion 42c (reinforcing member 40), the frame part 9 (inner panel 6) and the supporting portion Rs (lock stiffener Rb) are spot welded one another. Instead of spot welding, the lower connecting portion 42c, the frame part 9 and the lock stiffener Rb may be joined together by a fastening member, such as bolt.

Next, effects of the rear door structure 1 of the vehicle V according to the third embodiment will be described.

In the rear door structure 1, when vibration is transmitted to the inner panel 6 during running of the vehicle V shown in FIG. 11 or idling of the engine thereof, vibration of the space S bounded by the lateral beam 20 and the reinforcement parts 10a, 10b (see FIG. 12) can be suppressed since the reinforcing member 40 extends between the lateral beam 20 and the outer panel 5 as shown in FIG. 14. As a result, in the rear door structure 1, as compared with the conventional rear door structure (see, for example, Japanese unexamined patent publication No. H8-258568), in addition to the rigidity described with respect to the first and second embodiments, rigidity is further enhanced, and thus quietness of the vehicle V can be secured. In other words, in the rear door structure 1, rigidity and NV reduction performance of the vehicle V can be enhanced.

In addition, in the rear door structure 1, as shown in FIG. 14, the reinforcing member 40 is joined with the lateral beam 20 and also to other portion of the inner panel 6, specifically, to the lower portion 9c of the frame part 9. Therefore, rigidity of the lateral beam 20 and the reinforcing member 40 can be enhanced. As a result, vibration of the space S (see FIG. 12) can be efficiently suppressed.

Moreover, in the rear door structure 1, as shown in FIG. 14, the lock stiffener Rb is further joined with the lower portion 9c of the frame part 9 to which the locking device of the rear door is attached, in order to reinforce the lower portion 9c. Since the reinforcing member 40 is joined to both the lateral beam 20 and the lock stiffener Rb, rigidity of the lateral beam 20 and the reinforcement member 40 can be further enhanced. As a result, vibration of the space S (see FIG. 12) can be efficiently suppressed.

Further, in the rear door structure 1, as shown in FIG. 11, the reinforcing member 40 is disposed at the center portion of the rear door 2 in the vehicle width direction, which is the most susceptible to vibration. Therefore, vibration of the space S (see FIG. 12) can be further efficiently suppressed.

Moreover, in the rear door structure 1, as shown in FIG. 11, the reinforcing member 40 has the reinforcing portions 41, 41 on each side of the center line M in the width direction of the rear door 2. Therefore, the effect of suppressing vibration can be further enhanced.

Further, in the rear door structure 1, as shown in FIG. 13, the reinforcing member 40 has the upper connecting portion 42a, the middle connecting portion 42b and the lower connecting portion 42c for connecting two reinforcing portions 41, 41. Therefore, rigidity of the entire reinforcing member 40 can be enhanced, and at the same time, the reinforcing member 40 (reinforcing portion) can be easily installed to the inner panel 6 shown in FIG. 12. Moreover, the reinforcing member 40 is prevented from being deformed and thus the reinforcing portions 41, 41 from being bent or inclined, when a load is on the reinforcing member 40.

Moreover, in the rear door structure 1, the reinforcing member 40 is curved to correspond to the shape of the inner panel 6, as shown in FIG. 14. Therefore, when a load is on the reinforcing member 40, the reinforcing member 40 absorbs the load by slightly transforming itself at the curved portion K. As a result, in the rear door structure 1, strength of the inner panel 6, especially joining strength of the reinforcing member 40, can be enhanced.

As shown in FIG. 11, in the rear door structure 1, the window frame part 8 is bounded by the upper portion of the frame part 9 and the lateral beam 20, and below the window frame part 8, three triangular holes (when seen from the rear side as a plan view) are formed by the frame part 9, the lateral beam 20 and the reinforcement parts 10a, 10b. As a result, in the rear door structure 1, holes in the inner panel 6 bounded by the frame part 9, the lateral beam 20 and the reinforcement parts 10a, 10b are made as large as possible, leading to weight saving, while enhancing rigidity.

Figure 25:
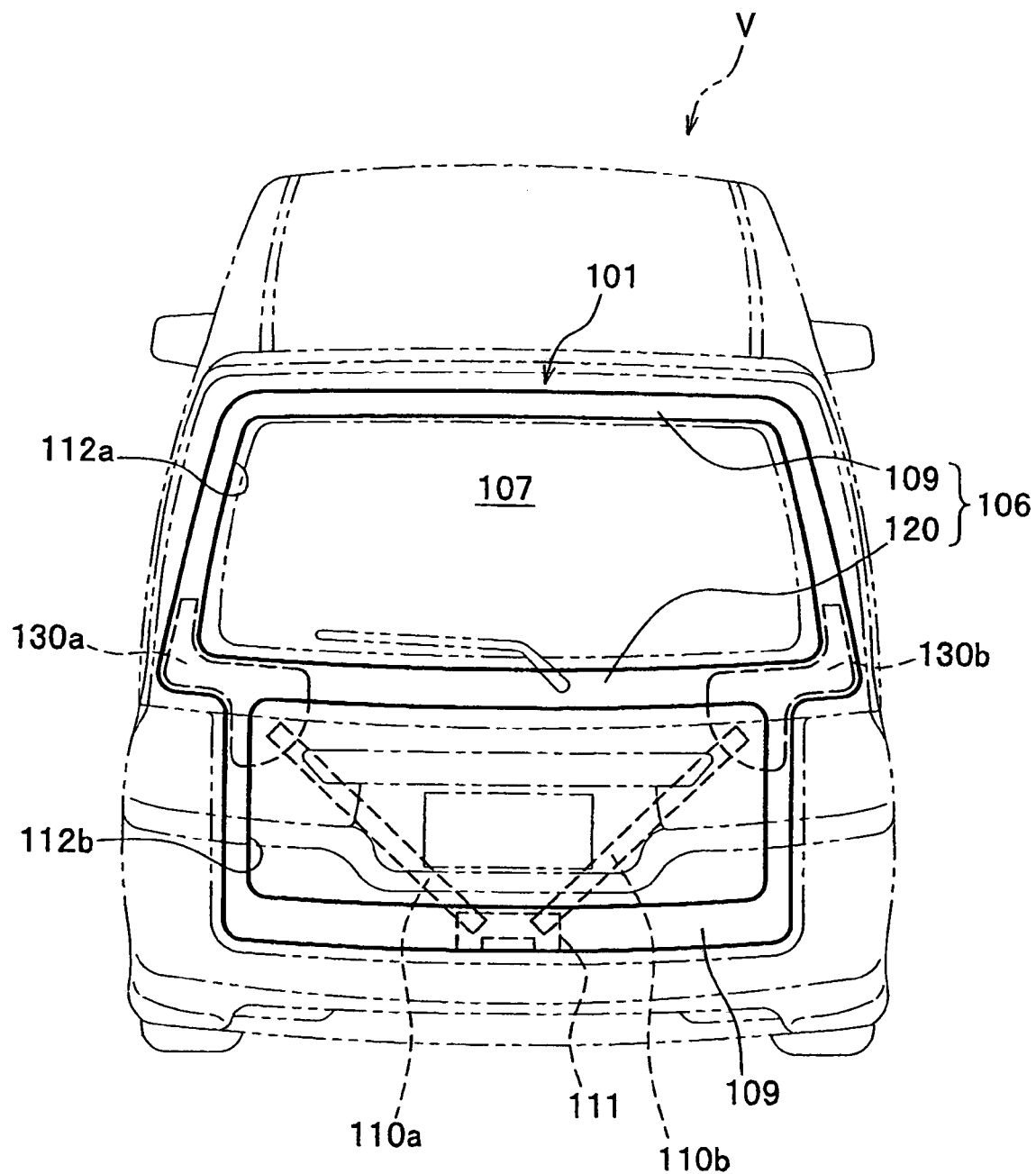
FIG. 25 is a schematic diagram illustrating a conventional rear door structure seen from a rear side of a vehicle.

In the rear door structure 1, the frame part 9, the lateral beam 20 and the reinforcement parts 10a, 10b are integrally formed by press molding or the like. Therefore, unlike the conventional rear door structure 101 (see FIG. 25), reinforcing does not require a plurality of reinforcements. As a result, weight saving is attained, while production cost is reduced and the number of production steps does not increase.

Modified Version of Third Embodiment

Figure 15A:
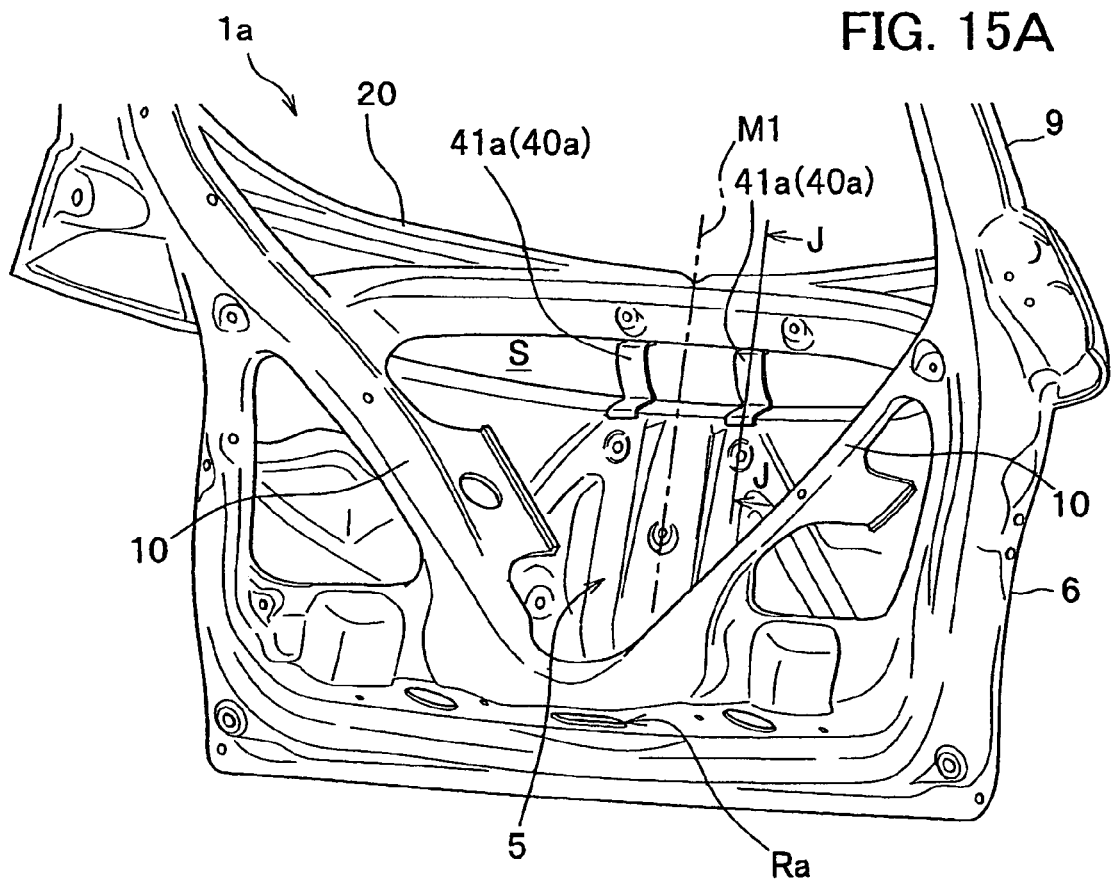
FIG. 15A is a perspective view of a rear door structure according to a modified version of the third embodiment seen from an inner panel side (inner side) of the vehicle.
Figure 15B:
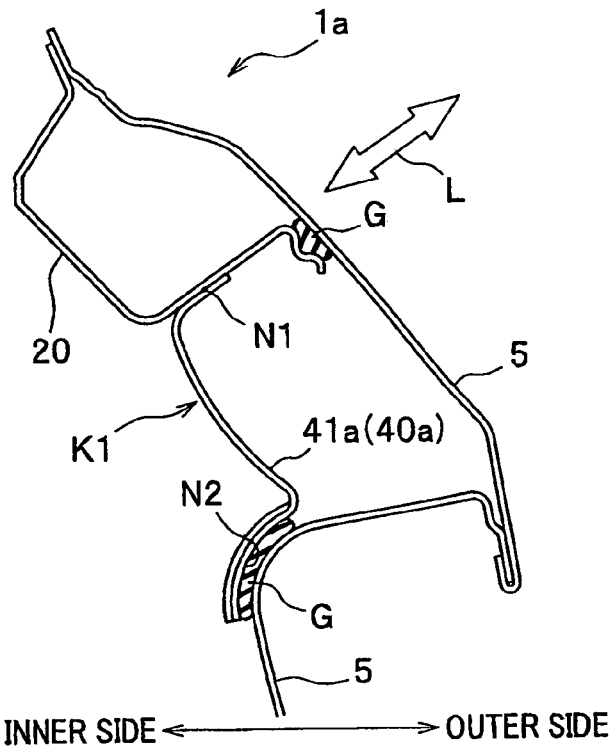
FIG. 15B is a sectional view taken along a line J-J in FIG. 15A.

The present invention is not limited to the above embodiments, and it is a matter of course that the above embodiments may be properly modified. For example, in the third embodiment, the reinforcing member 40 is joined to the lateral beam 20 of the inner panel 6, the outer panel 5 and the lower portion 9c of the frame part 9 of the inner panel 6. However, the reinforcing member 40 may be joined to any other portions as long as it is joined at least to the lateral beam 20 and the outer panel 5. FIG. 15A is a perspective view of a rear door structure according to a modified version of the third embodiment seen from an inner panel side (inner side) of the vehicle. FIG. 15B is a sectional view taken along a line J-J in FIG. 15A. In the present embodiment, some components, which are the same as those illustrated in the above-mentioned embodiments, are designated with the same reference characters, and thus a duplicate description is omitted.

As shown in FIG. 15A, the rear door structure 1a according to the present embodiment includes a reinforcing member 40a having a pair of long and narrow reinforcing portions 41a, 41a. The reinforcing portions 41a, 41a extend in a vertical direction and are arranged approximately in parallel while flanking a center line M1 in a width direction of the inner panel 6. It should be noted that the center line M1 matches the center line M in a width direction of the rear door 2 shown in FIG. 11.

The reinforcing portion 41a is produced by bending a metal plate, and as shown in FIG. 15B, a middle portion K1 (a portion that is not in contact with the lateral beam 20 and the outer panel 5) is configured in a shape of an arch protruding towards the inner side of the vehicle. An upper portion of the reinforcing portion 41a is curved in an approximate L-shape, from the curved portion K1 to the outer side of the vehicle. The lateral beam 20 has a square U-shaped cross section as described above. A bent upper end portion of the lateral beam 20 is joined to the outer panel 5 by spot welding, and a lower end portion is joined with the outer panel 5 by an adhesive layer G composed of mastic sealer or the like. The adhesive layer G has a function of dispersing and dissipating a load applied between the lateral beam 20 and the outer panel 5. The reinforcing portion 41a and the lateral beam 20 are joined at a joint face N1 therebetween by spot welding. An extending direction of the joint face N1 from the inner side to the outer side of the vehicle matches the opening/closing direction L of the rear door 2. A lower portion of the reinforcing portion 41a is curved from the curved portion K1 to the inner side of the vehicle to correspond to the inner face of the outer panel 5. The lower portion of the reinforcing portion 41a is joined with the outer panel 5 by an adhesive layer G composed of mastic sealer or the like. The adhesive layer G has a function of dispersing and dissipating a load applied between the reinforcing portion 41a and the outer panel 5. In the present embodiment, a joint face N2 between the reinforcing portion 41a and the outer panel 5 is configured in a shape of an arch to correspond to the curved corner of the outer panel 5. However, in the present invention, a plane of the joint face N2 extending from the inner side to the outer side of the vehicle may cross the opening/closing direction L of the rear door 2. In the present embodiment, the upper portion of the reinforcing portion 41a and the lateral beam 20 are joined by spot welding. However, in the present invention, they may be joined together by fastening members, such as bolt. In this embodiment, the lower portion of the reinforcing portion 41a and the outer panel 5 is joined by the adhesive layer G. However, in the present invention, they may be joined together by spot welding or by fastening members, such as bolt.

Next, effects of the rear door structure 1a will be described.

In the rear door structure 1a, like the above-mentioned embodiments, vibration of the space S bounded by the lateral beam 20 and the reinforcement parts 10a, 10b of the inner panel 6 can be suppressed since the reinforcing member 40a (reinforcing portion 41a) extends between the lateral beam 20 and the outer panel 5. As a result, in the rear door structure 1a, as compared with the conventional rear door structure (see, for example, Japanese unexamined patent publication No. H8-258568), quietness of the vehicle is secured.

In addition, in the rear door structure 1a, the reinforcing member 40a is curved as shown in FIG. 15B. Therefore, when a load is on the reinforcing member 40a, the reinforcing member 40a absorbs the load by slightly transforming itself at the curved portion K1. As a result, in the rear door structure 1a, strength of the inner panel 6, especially joining strength of reinforcing member 40a, can be enhanced.

Moreover, in the rear door structure 1a, the extending direction of the joint face N1 formed between the reinforcing portion 41a and the lateral beam 20 matches the opening/closing direction L of the rear door 2. Therefore, during opening/closing of the rear door 2, no load is generated in a direction that tends to separate the components forming the joint face N1. As a result, joint of the reinforcing portion 41a and the lateral beam 20 can be excellently maintained.

Further, in the rear door structure 1a, the joint face N2 between the reinforcing portion 41a and the outer panel 5 is curved. Therefore, during opening/closing of the rear door 2, a shearing force on the adhesive layer G present on the joint face N2 is reduced. As a result, joint of the reinforcing portion 41a and the outer panel 5 can be excellently maintained. Likewise, in a case of the rear door structure 1a having a plane of the joint face N2 crossing the opening/closing direction L of the rear door 2 (see FIG. 11), a shearing force on the adhesive layer G present on the joint face N2 is reduced, and joint of the reinforcing portion 41a and the outer panel 5 can be excellently maintained.

Moreover, in the rear door structure 1a, the reinforcing member 40a has a simple structure with a pair of reinforcing portion 41a, 41a. Therefore, the number of parts of the rear door structure 1a can be reduced, while production cost is reduced and the number of production steps does not increase.

Further, in the rear door structure 1a, as shown in FIG. 15A, the reinforcing member 40a is disposed at the center portion of the rear door 2 in the width direction, which is the most susceptible to vibration. Therefore, vibration of the space S can be further efficiently suppressed.

Moreover, in the rear door structure 1a, as shown in FIG. 15A, the reinforcing member 40a has the reinforcing portion 41a, 41a on each side of the center line M1 in the width direction of the inner panel 6. Therefore, the effect of suppressing vibration is further enhanced.

In the above-mentioned rear door structure 1, as shown in FIG. 13, the reinforcing member 40 has two reinforcing portions 41, 41, and in the rear door structure 1a, as shown in FIG. 15A, the reinforcing member 40a has two reinforcing portions 41a, 41a. However, in the present invention, any number of the reinforcing portion can be used: for example, one reinforcing portion, or more than two reinforcing portion, can be used.

In addition, in the rear door structure 1, as shown in FIG. 14, the reinforcing member 40 (lower connecting portion 42c) is sandwiched between the lower portion 9c of the frame part 9 and the lock stiffener Rb, and welded to both the frame part 9 and the lock stiffener Rb. However in the present invention, the reinforcing member 40 may be welded only to the lock stiffener Rb, which is then joined to the lower portion 9c of the frame part 9.

Another Embodiment

In the rear door structure for a vehicle according to the present invention, a wiper bracket can be easily installed since a space is secured for operation of wiper bracket installation, due to its inner panel structure. An example of the wiper bracket will be described below with reference to FIGS. 16-21. In the present embodiment, some components, which are the same as those illustrated in the above-mentioned embodiments, are designated with the same reference characters, and thus a duplicate description is omitted.

Figure 16:
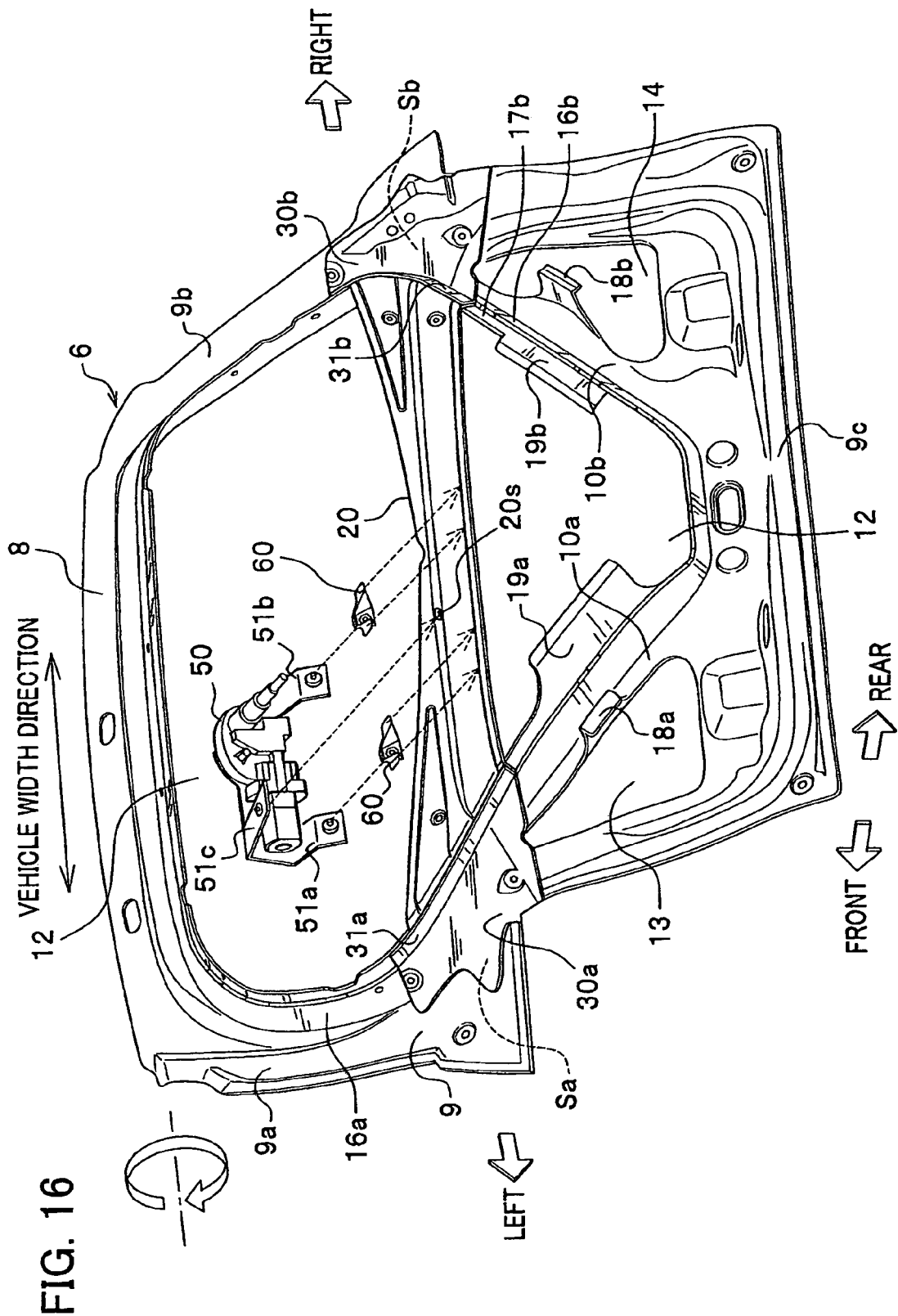
FIG. 16 is a perspective view of an inner panel of the rear door structure according to another embodiment of the present invention seen from a rear side of the vehicle.

As shown in FIG. 16, a wiper unit 50 can be attached to the lateral beam 20 by a pair of wiper brackets 60, 60.

Figure 17:
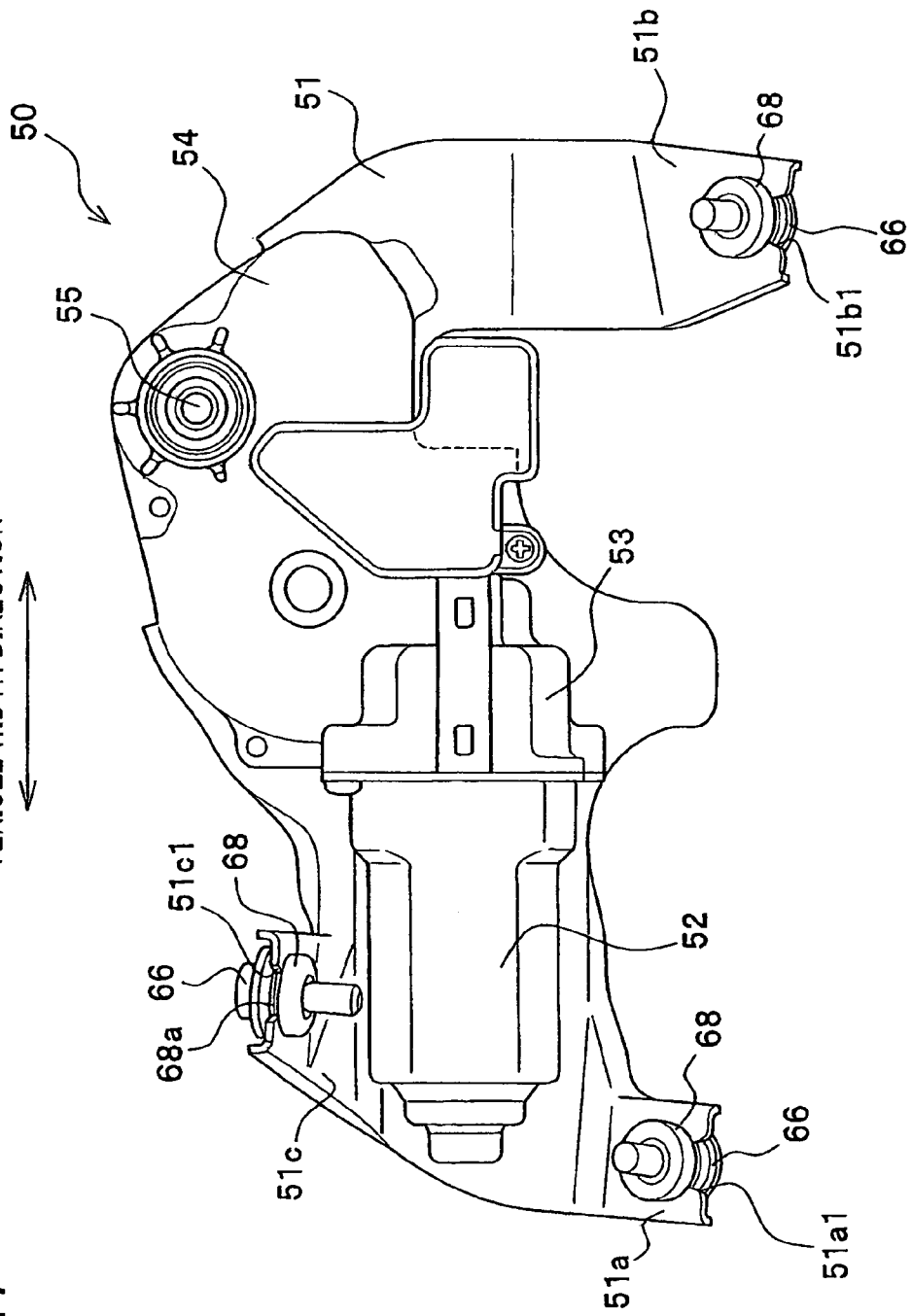
FIG. 17 is a plan view of a wiper unit seen from a pivot side.

As shown in FIG. 17, the wiper unit 50 includes: a base member 51, a wiper motor 52, a deceleration part 53 lodging a group of reduction gears (not shown), a power transmission part 54 lodging a group of power transmission gears (not shown), all disposed in parallel in the vehicle width direction, on the base member 51. Each of the deceleration part 53 and the power transmission part 54 may be a gearbox integrally formed by molding of synthetic resin material or the like. The power transmission part 54 has a wiper pivot 55 extending obliquely and upward, in a rear direction. To an end of the wiper pivot 55, a wiper arm (not shown) with a wiper blade is to be attached. The power transmission part 54 has a function of converting one-way rotations of the wiper motor 52 and the deceleration part 53 into a back-and-forth motion of the wiper pivot 55.

The base member 51, which is produced by press molding of a metal plate having an appropriate thickness, has an irregular shape basically extending in the vehicle width direction. At both ends of a lower rim of the base member 51 in the vehicle width direction, brackets 51a, 51b extend in the same direction as an extending direction of the wiper pivot 55, and at a left end of an upper rim of the base member 51, a bracket 51c extends in the same direction as the above (see FIG. 21). At end portions of bracket 51a, 51b, 51c, cutout portions 51a1, 51b1, 51c1 each in a U-shape (not shown) are formed. The end portions of the brackets 51a, 51b are curved to correspond to a face of the lateral beam 20.

Figure 18A:
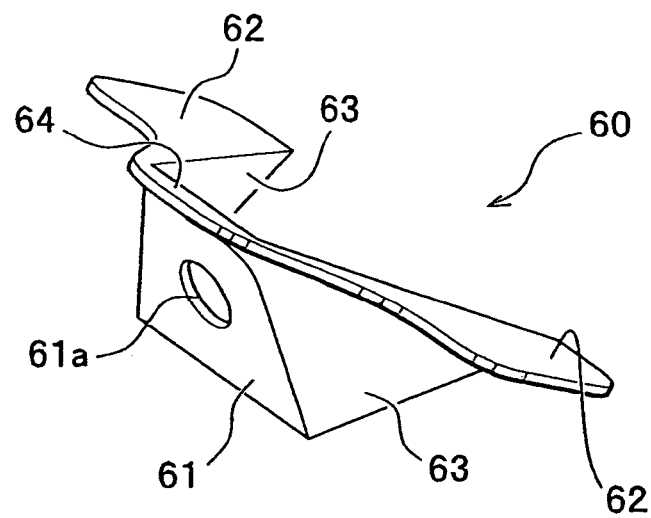
FIG. 18A is a perspective view of a wiper bracket.
Figure 18B:
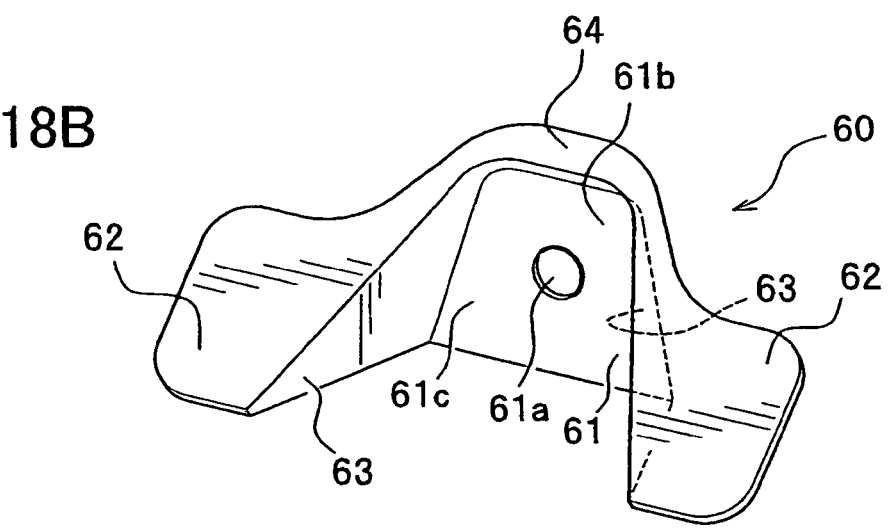
FIG. 18B is another perspective view of the wiper bracket.
Figure 21:
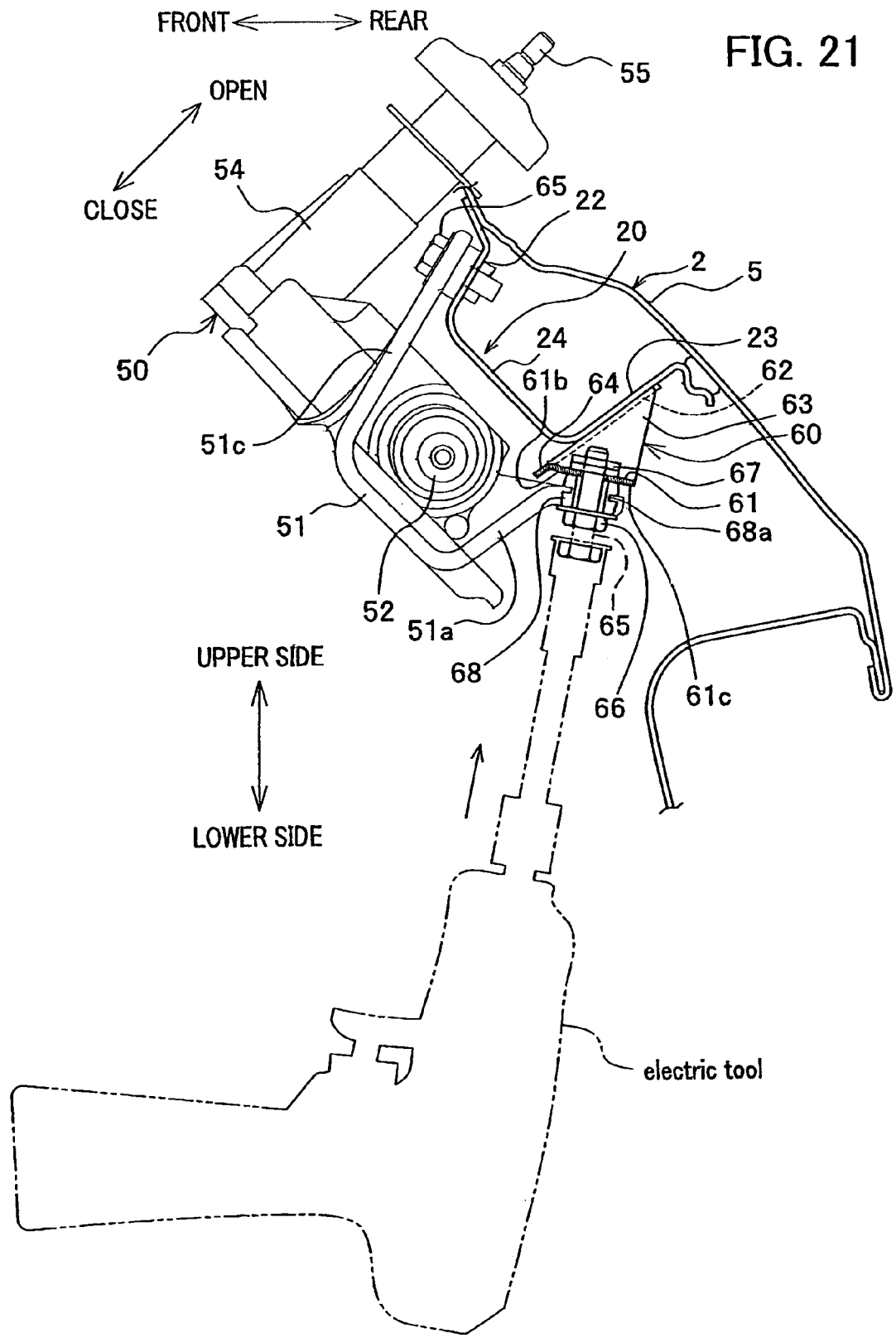
FIG. 21 is a sectional view taken along a line Q-Q in FIG. 19.

As shown in FIGS. 18A and 18B, the wiper bracket 60, which is produced by press molding a metal plate, includes a wiper mounting portion 61 for mounting the wiper unit 50, and a beam mounting portion 62 to be mounted on the lateral beam 20 (see FIG. 21).

Figure 18C:
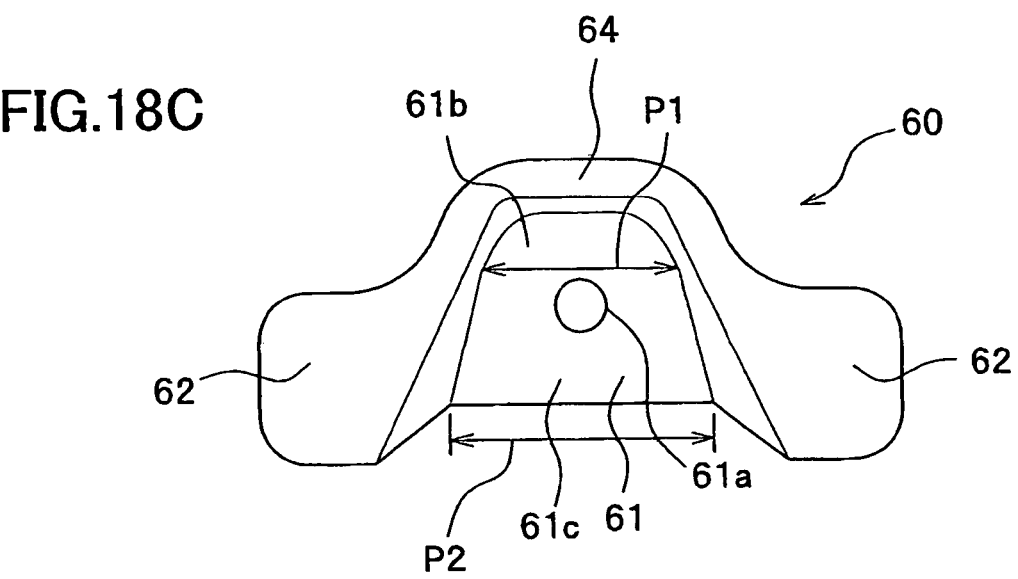
FIG. 18C is a plan view of the wiper bracket.
Figure 19:
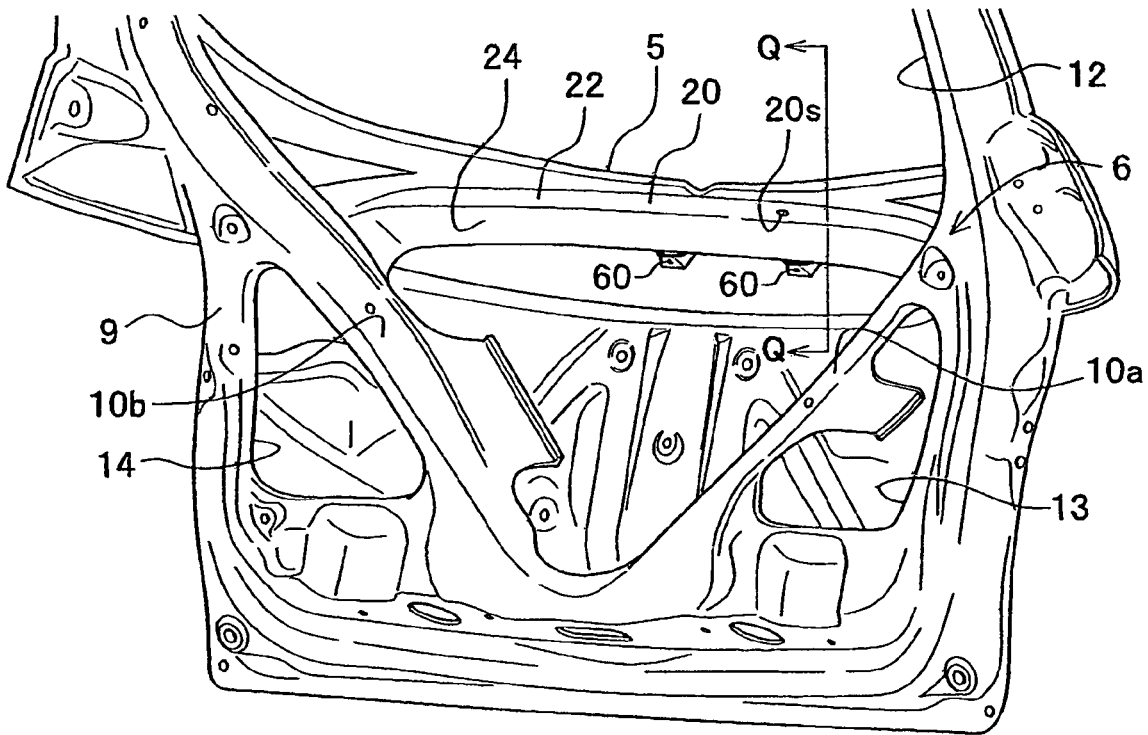
FIG. 19 is a perspective view of a rear door structure to which the wiper brackets are attached, seen from an inner side of the vehicle.
Figure 20:
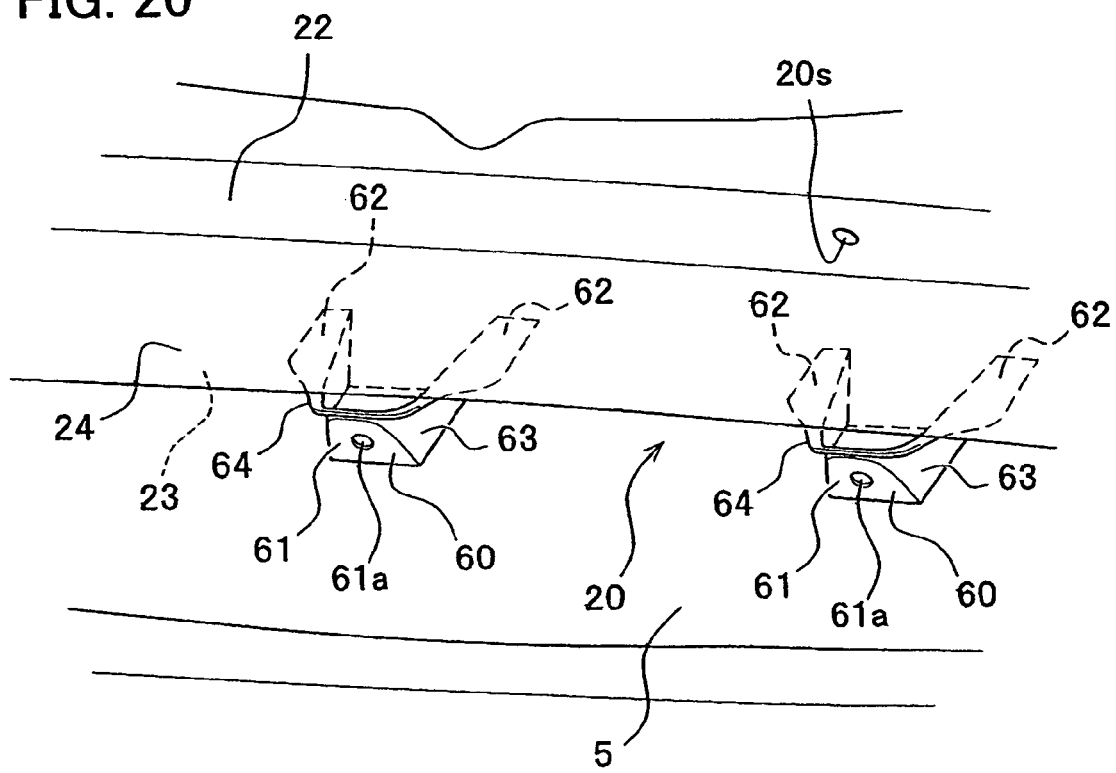
FIG. 20 is an enlarged perspective view showing a wiper bracket installment.

As shown in FIG. 18C, the wiper mounting portion 61 is formed in a shape of an approximate trapezoid, with a width P1 of an upper portion 61b being shorter than a width P2 of a lower portion 61c. In a center portion, a through-hole 61a is formed. Thus, the wiper mounting portion 61 is formed in such a manner that the width becomes larger from the upper portion 61b to the lower portion 61c. In the present embodiment, the upper side portion 61b is positioned on the inner side (front side) of the vehicle, and the lower side portion 61c is positioned on the outer side (rear side) of the vehicle (see FIG. 21).

The beam mounting portion 62 is formed on each side of the wiper mounting portion 61. The beam mounting portion 62 is formed in a shape of an approximate rectangle, and tilted with a distance from the wiper mounting portion 61 becoming larger from the upper portion 61b to the lower portion 61c (see FIG. 18A). At the same time, the beam mounting portions 62, 62 flank the wiper mounting portion 61 and extend away from each other. The beam mounting portions 62, 62 are contiguous to wall portions 63, 63 each in a shape of an approximate triangle, which is contiguous to the wiper mounting portion 61.

In the wiper bracket 60, on a side of the upper portion 61b of the wiper mounting portion 61 and on an upper end portion of the tilted upper rim the wall portion 63, 63, a flange portion 64 in a shape of an approximate arch, when seen as a plan view, is formed, which is narrower than the beam mounting portion 62. The flange portion 64 has a surface tilted at the same angle as the beam mounting portion 62 and is contiguous to the beam mounting portion 62 in the same plane.

In the rear door structure of the vehicle V according to the present embodiment as described above, as shown in FIGS. 19 and 20, two wiper brackets 60, 60 are fixed to the lateral beam 20 at a specific distance in the vehicle width direction, and as shown in FIG. 16, the brackets 51a, 51b at a lower portion of the wiper unit 50 are fixed to the wiper brackets 60, 60, and the bracket 51c at an upper portion of the wiper unit 50 is fixed to the lateral beam 20. It should be noted that the beam mounting portion 62 of the wiper bracket 60 is fixed to a lower wall portion 23 of the lateral beam 20 by welding, as shown in FIG. 21, while the flange portion 64 of the wiper bracket 60 protrudes towards the inner side (front side) of the vehicle further than a face portion 24 of the lateral beam 20.

To the wiper brackets 60 fixed to the lower wall portion 23 of the lateral beam 20, the brackets 51a, 51b of the wiper unit 50 (see FIG. 17) are attached by fastening member 65. The fastening member 65 is composed of a bolt 66, a nut 67 and a mounting member 68. The mounting member 68 is in a shape of a cylinder made of elastic material, such as rubber, and has a groove portion 68a formed in a periphery thereof in a circumferential direction. The wiper bracket 60 is installed in the following manner. First, the groove portion 68a of the mounting member 68 is inserted into a cutout portion 51a1 of the bracket 51a (see FIG. 17), and the bolt 66 is inserted in the mounting member 68 and the through-hole 61a and engaged with the nut 67, to thereby fix the bracket 51a of the wiper unit 50 to the wiper bracket 60. Likewise, the bracket 51b of the wiper unit 50 is fixed to the other wiper bracket 60 using the fastening member 65. The bracket 51c at an upper portion of the wiper unit 50 is fixed to the mount hole 20s formed in an upper wall portion 22 of the lateral beam 20, using the fastening member 65.

It should be noted that, when installation of the reinforcing member 4 as described above is desired, a shape and a dimension of the reinforcing member 4 can be modified so that the reinforcing member 4 is not brought into contact with the wiper unit 50.

Still Another Embodiment

In the rear door structure for a vehicle the present invention, a spoiler having a integrated component therein, such as a high mount stop lamp showing operation of braking, and a washer nozzle, can be mounted thereon. An example of the spoiler will be described below with reference to FIGS. 22-24. Some components, which are the same as those illustrated in the above-described embodiments, are designated with the same reference characters, and thus a duplicate description is omitted.

<Configuration of Spoiler>

Figure 22:
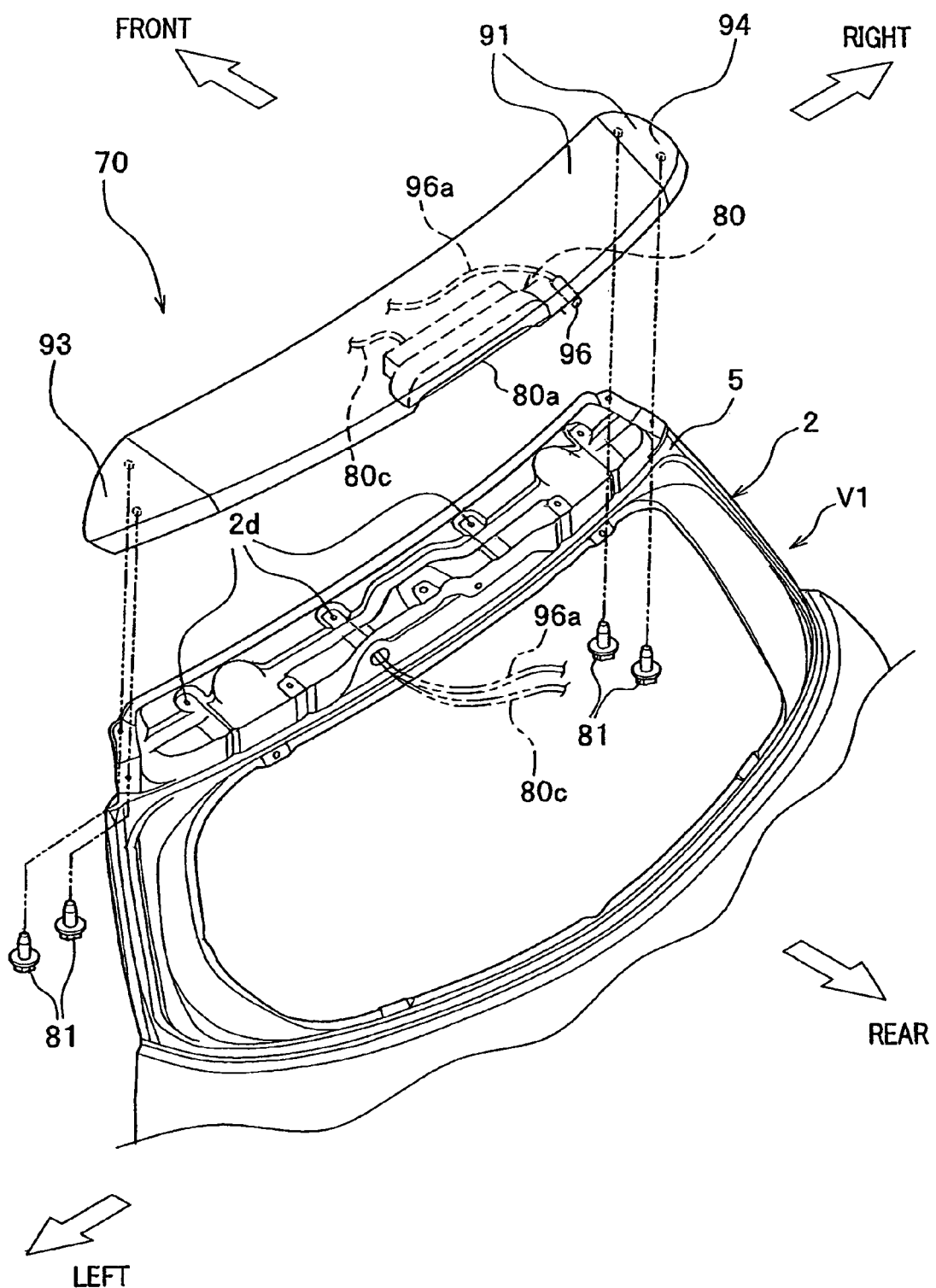
FIG. 22 is an exploded perspective view of main components of a spoiler attached to a rear door structure according to still another embodiment of the present invention.

As shown in FIG. 22, a spoiler 70 for adjusting air stream around the vehicle body is disposed on an outer face of the vehicle body V1. The spoiler 70 is, for example, a member made of resin laterally extending along an upper end portion of the rear door 2, fixed to the rear door 2 along a roof panel V3 by fastening members 81,83, such as clips (see FIGS. 22 and 24).

Figure 23:
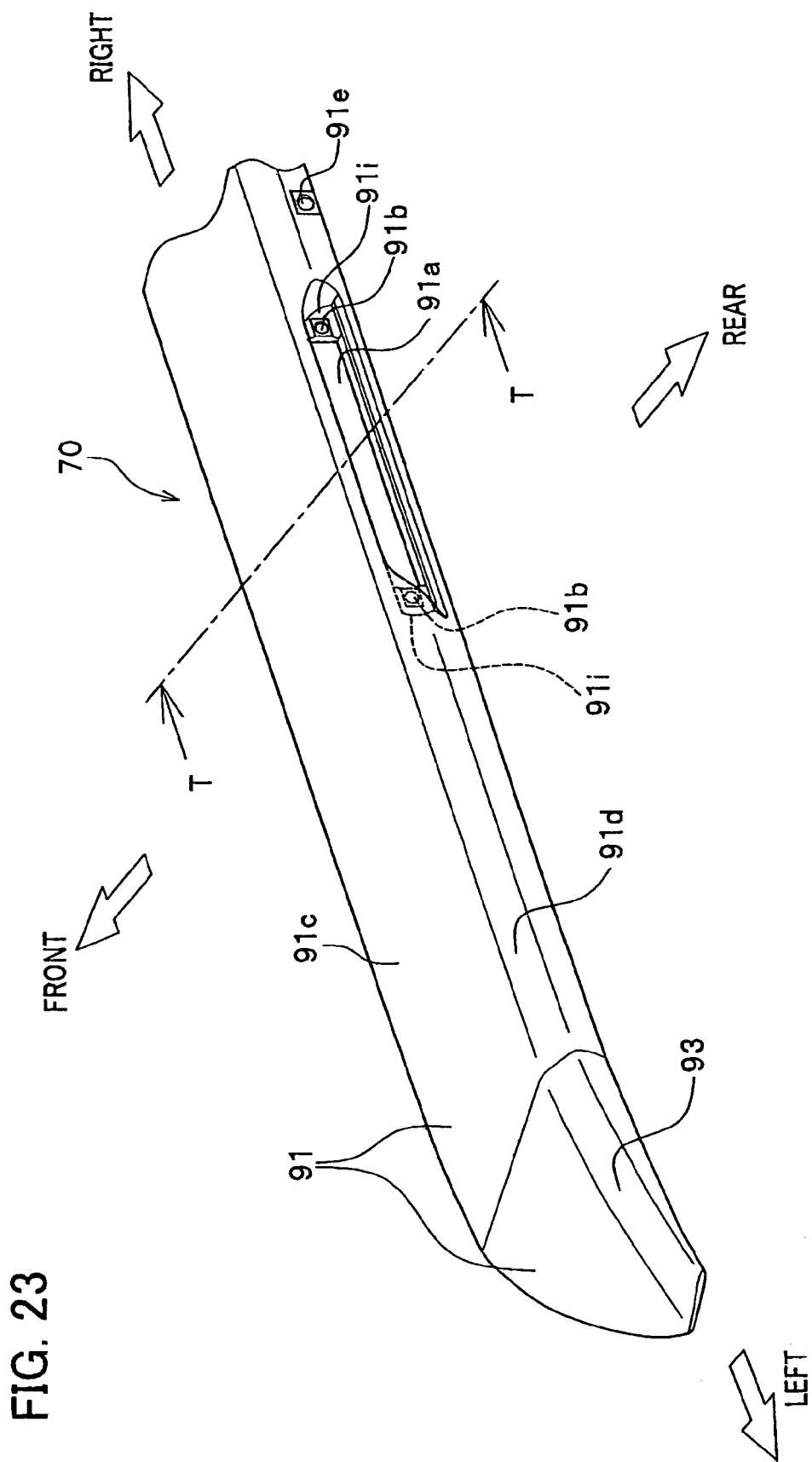
FIG. 23 is an enlarged perspective view of a main portion of the spoiler with a high mount stop lamp being removed.

As shown in FIG. 23, an opening 91a for housing a high mount stop lamp 80 is formed at a center part of a rear part of the spoiler 70. The high mount stop lamp 80 is mainly composed of: a light source, such as light bulb (not shown); a lamp housing 80b disposed in such a manner that it closes the opening 91a; and a lens part 80a disposed at the outer side (rear side) of the lamp housing 80b which illuminates a red light by receiving a light from the light source. As shown in FIG. 22, the light source of the high mount stop lamp 80 is connected to a power source through a lead wire 80c extending from the lamp housing 80b and through a stop lamp switch (not shown) provided in the vehicle body V1.

At the opening 91a, the lens part 80a of the high mount stop lamp (integrated component) 80 (see FIGS. 22 and 24) is disposed in such a manner that the lens part 80a is exposed as an outer surface. The narrow and long opening 91a extends laterally so as to match the shape of the high mount stop lamp 80. This portion of a rear plate portion 91d of the spoiler 70 is recessed towards the inner side and formed in a shape of an approximate cylinder. At each of right and left ends of the opening 91a, a seating face 91i in a shape of a plate having a through-hole 91b is formed, which through-hole is for inserting fastening member 82 (not shown) for fixing the lens part 80a of the high mount stop lamp 80 (see FIGS. 22 and 24). On the right side of the opening 91a, a nozzle mounting hole 91e is formed for installing a washer nozzle 96 (see FIG. 22) connected to a hose 96a that leads to a washer tank (not shown).

Figure 24:
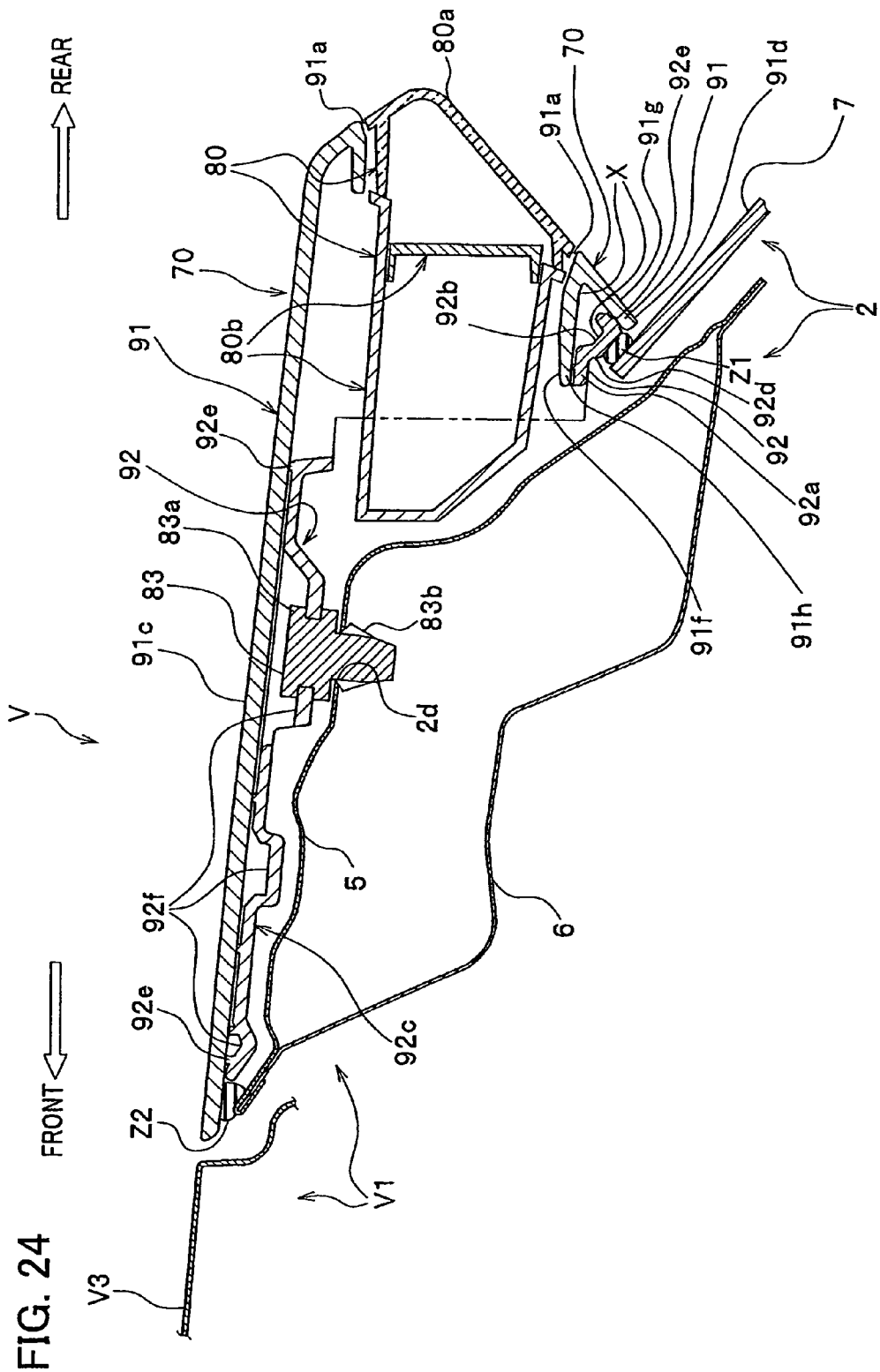
FIG. 24 is a sectional view taken along a line T-T in FIG. 23.

FIG. 24 is a cross section taken along a line T-T in FIG. 23.

As shown in FIG. 24, the spoiler 70 is mainly composed of an outer member 91 forming an outer surface on the vehicle V, and an inner member 92 disposed on an inner side of the outer member 91. The spoiler 70 also includes side members 93, 94 (see FIG. 22) disposed on both lateral ends of the outer member 91 that form right and left end portions of the spoiler 70.

In the present embodiment, the side members 93, 94, the outer member 91 and the inner member 92 have overlapping portions which are fixed by vibration welding or supersonic welding.

<Configuration of Outer Member>

The outer member 91 is a member that forms an outer face of the spoiler 70. The outer member 91 has a cross section in an approximate lying V-shape.

<Configuration of Inner Member>

As shown in FIG. 24, the inner member 92 is disposed on the inner side of the outer member 91 of the spoiler 70. The inner member 92 is formed of: an upper inner portion 92c joined with an inner face of an upper plate portion 91c of the outer member 91 and a rear inner portion 92d which is contiguous to the upper inner portion 92c and joined with an inner face of the rear plate portion 91d of the outer member 91. The upper inner portion 92c and the rear inner portion 92d together form an approximate upside-down L-shape. On a face of the inner member 92 in contact with the outer member 91, a number of welding ribs 92e each in a shape of triangular protrusion are formed at appropriate positions, for joining the inner member 92 with the outer member 91 by supersonic welding, vibration welding or the like.

As shown in FIG. 24, the upper inner portion 92c has a plurality of reinforcing groove portions 92f extending in the vehicle width direction, with various sizes in a shape of triangle or square, when seen from a side. Holes are formed in bottoms of some of the reinforcing groove portions 92f, and to the hole a head portion 83a of the fastening member 83 composed of a clip made of resin is fixed by thermal caulking. By engaging an elastic locking portion 83b of the fastening member 83 with an engagement hole 2d formed in the outer panel 5 of the rear door 2 (see FIGS. 22 and 24), the inner member 92 of the spoiler 70 is fixed to the rear door 2. The head portion 83a of the fastening member 83 is configured so as to be contained in the reinforcing groove portion 92f and not to protrude above a level of the face of the inner member 92 that is brought into contact with the outer member 91.

<Configuration of Portion Below Opening>

As shown in FIG. 24, a portion of the outer member 91 below the opening 91a includes: an upper wall portion 91f for supporting the high mount stop lamp 80; and a lower wall portion 91g contiguously formed with the upper wall portion 91f, and the portion below the opening 91a is formed so as to protrude to the outer side (rear side) (in an approximate lying V-shape when seen from a side). In the portion of the outer member 91 below the opening 91a, fixing portions 91h, 92a extend from the outer member 91 and the inner member 92, respectively, in an approximate horizontal direction (front direction) and joined with each other. At the portion below the opening 91a, the outer member 91 and the inner member 92 forms a closed cross section X which reinforces this portion. On this reinforced upper wall portion 91f, the high mount stop lamp 80 is installed.

<Configuration of Closed Cross Section>

The closed cross section X is formed like a truss in a shape of an approximate triangle, by joining the inner member 92 with the inner faces of the upper wall portion 91f and lower wall portion 91g. In the closed cross section X, a portion of the inner member 92 forming the closed cross section X abuts a sealing material Z1 which is another component of the vehicle V in addition to the outer member 91. In other words, an outer face of a portion of the inner member 92 positioned in the closed cross section X is fixed to the rear window 7 by the sealing material Z1. In the closed cross section X, the inner member 92 is reinforced by a step portion 92b in a shape of a recess formed on an inner side in the closed cross section X.

The sealing material Z1 is, for example, formed of an adhesive called dam rubber or the like, and is disposed between the inner member 92 and the rear window 7 in close contact therewith.

What is claimed is:

1. A rear door structure for a vehicle comprising an inner panel disposed on an inner side of the vehicle and an outer panel disposed on an outer side of the vehicle, the inner panel comprising:
a frame part corresponding to a contour of the rear door,
a pair of reinforcement parts that are integrally formed with the frame part, extend from a lower portion to both side portions of the frame part and are arranged in an approximate V-shape, and
a face portion smoothly and contiguously formed along an inner rim of the frame part from the side portion to the reinforcement part, wherein
the face portion has a step portion contiguously formed in an extending direction of the face portion.

2. The rear door structure according to claim 1, further comprising a lateral beam extending between two connecting portions each connecting the side portion and the reinforcement part of the frame part,
an end portion of the lateral beam being joined with the step portion.

3. The rear door structure according to claim 2, further comprising corner stiffeners provided at the end portions of the lateral beam,
the corner stiffeners being disposed on the inner panel and joined to the step portions.

4. The rear door structure according to claim 1, wherein the face portion stands in an opening/closing direction of the rear door.

5. The rear door structure according to claim 2, wherein the face portion and the end portion of the lateral beam for being joined with the step portion protrude in an opening/closing direction of the rear door.

6. The rear door structure according to claim 3, wherein the face portion, the end portion of the lateral beam for being joined with the step portion, and a joint portion of the corner stiffener protrude in an opening/closing direction of the rear door.

7. The rear door structure according to claim 2, further comprises a reinforcing member that extends between the lateral beam and the outer panel and is joined with both of them.

8. The rear door structure according to claim 7, wherein the reinforcing member is joined with the inner panel further at other portion of the reinforcing member than a portion joined with the lateral beam.

9. The rear door structure according to claim 7, wherein the reinforcing member is joined with a lock stiffener provided on a lower portion of the frame part.

10. The rear door structure according to claim 7, wherein the reinforcing member is disposed at a center portion in a width direction of the rear door.

11. The rear door structure according to claim 10, wherein the reinforcing member comprises a pair of reinforcing portions on each side of a center line in the width direction of the rear door.

12. The rear door structure according to claim 11, wherein the reinforcing member further comprises a connecting portion for connecting the reinforcing portions.

13. The rear door structure according to claim 7, wherein the inner panel is curved and the reinforcing member is curved so that a curvature of the reinforcing member corresponds to a curvature of the inner panel.

14. The rear door structure according to claim 7, wherein the inner panel and the lateral beam are integrally formed.

* * * * *